United States Patent
Mori et al.

(10) Patent No.: US 10,491,993 B2
(45) Date of Patent: Nov. 26, 2019

(54) WATERPROOF SOUND-TRANSMITTING MEMBRANE, WATERPROOF SOUND-TRANSMITTING MEMBER INCLUDING SAME, ELECTRONIC DEVICE, ELECTRONIC DEVICE CASE, AND WATERPROOF SOUND-TRANSMITTING STRUCTURE

(71) Applicant: Nitto Denko Corporation, Ibaraki-shi, Osaka (JP)

(72) Inventors: Masaaki Mori, Osaka (JP); Satoru Furuyama, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/440,533

(22) PCT Filed: Jul. 2, 2014

(86) PCT No.: PCT/JP2014/003540
§ 371 (c)(1),
(2) Date: May 4, 2015

(87) PCT Pub. No.: WO2015/029302
PCT Pub. Date: Mar. 5, 2015

(65) Prior Publication Data
US 2015/0304767 A1    Oct. 22, 2015

(30) Foreign Application Priority Data
Aug. 30, 2013 (JP) ................. 2013-179686

(51) Int. Cl.
*H04R 1/44* (2006.01)
*H04M 1/03* (2006.01)
(Continued)

(52) U.S. Cl.
CPC ............. *H04R 1/44* (2013.01); *H04B 1/3888* (2013.01); *H04M 1/03* (2013.01); *H04M 1/18* (2013.01);
(Continued)

(58) Field of Classification Search
CPC ...... H04R 2499/11; H04R 1/44; H04R 1/086; H04R 1/023; H04B 1/3888;
(Continued)

(56) References Cited

U.S. PATENT DOCUMENTS 4,832,997 A * 5/1989 Balanzat ............ B01D 67/0032
216/66
5,828,012 A 10/1998 Repolleet et al.
(Continued)

FOREIGN PATENT DOCUMENTS

CN 101580598 A 11/2009
EP 2 583 734 4/2013
(Continued)

OTHER PUBLICATIONS

Extended European Search Report issued in corresponding European Application No. 14839202.0, dated Jan. 27, 2016, 9 pages.
(Continued)

*Primary Examiner* — Kile O Blair
(74) *Attorney, Agent, or Firm* — Hamre, Schumann, Mueller & Larson, P.C.

(57) ABSTRACT

A waterproof sound-transmitting membrane of the present disclosure includes: a non-porous resin film having formed therein a plurality of through holes extending through a thickness of the non-porous resin film; and a liquid-repellent layer formed on a principal surface of the resin film and having openings at positions corresponding to positions of the plurality of through holes. The through holes have a diameter of 4.0 μm or more and 12.0 μm or less, and the
(Continued)

waterproof sound-transmitting membrane has a through-thickness air permeability of 2.0 cm$^3$/(cm$^2$·second) or more and 50 cm$^3$/(cm$^2$·second) or less in terms of Frazier number as measured according to JIS L 1096. With this waterproof sound-transmitting membrane placed over an opening of a housing of an electronic device or the like, entry of water into the housing from outside can be prevented, in addition to which the characteristics of sound transmitted through the membrane can be kept even when the membrane has a reduced effective area.

10 Claims, 13 Drawing Sheets

(51) Int. Cl.
  *H04M 1/18* (2006.01)
  *H04B 1/3888* (2015.01)
  *H04B 1/38* (2015.01)
  *H04R 1/00* (2006.01)
  *H04R 7/00* (2006.01)

(52) U.S. Cl.
  CPC ........ *H04B 2001/3894* (2013.01); *H04R 1/00* (2013.01); *H04R 7/00* (2013.01); *H04R 2499/11* (2013.01)

(58) Field of Classification Search
  CPC ............ H04B 2001/3894; H04M 1/03; H04M 1/035; H04M 1/18; B32B 3/266; B32B 27/12; B32B 2307/7246; B32B 2307/73; B32B 3/26; B01D 2239/1216; B01D 2325/02; B01D 39/1692; B01D 2239/1291; B01D 2279/45; B01D 2239/801
  USPC ........................................................ 381/189
  See application file for complete search history.

(56) References Cited

U.S. PATENT DOCUMENTS

| | | | |
|---|---|---|---|
| 2002/0126865 A1* | 9/2002 | Cimaz | H04R 1/225 381/357 |
| 2009/0277141 A1 | 11/2009 | Abe et al. | |
| 2011/0188247 A1 | 8/2011 | Huang et al. | |
| 2011/0255728 A1 | 10/2011 | Abe et al. | |
| 2012/0247647 A1* | 10/2012 | Moriyama | H01G 13/00 156/89.12 |
| 2013/0074691 A1* | 3/2013 | Furuyama | B01D 46/54 95/45 |
| 2013/0333978 A1 | 12/2013 | Abe et al. | |
| 2014/0217782 A1 | 8/2014 | Mohrlock et al. | |

FOREIGN PATENT DOCUMENTS

| | | | | |
|---|---|---|---|---|
| JP | 2011171728 A | * | 9/2011 | |
| JP | 2012-025160 | | 2/2012 | |
| JP | 2012020279 A | * | 2/2012 | B01D 46/54 |
| JP | 2012-195928 | | 10/2012 | |
| JP | 2003-053872 | | 2/2013 | |
| WO | 2013/004347 | | 1/2013 | |

OTHER PUBLICATIONS

Office Action issued for European Patent Application No. 14839202.0, dated Jul. 25, 2018, 4 pages.

\* cited by examiner

WATERPROOF SOUND-TRANSMITTING MEMBRANE, WATERPROOF SOUND-TRANSMITTING MEMBER INCLUDING SAME, ELECTRONIC DEVICE, ELECTRONIC DEVICE CASE, AND WATERPROOF SOUND-TRANSMITTING STRUCTURE

TECHNICAL FIELD

The present invention relates to a waterproof sound-transmitting membrane having both waterproofness and sound transmissivity, to a waterproof sound-transmitting member including the waterproof sound-transmitting membrane, to an electronic device, to an electronic device case, and to a waterproof sound-transmitting structure.

BACKGROUND ART

In recent years, it has been common for electronic devices such as mobile phones, tablet computers, digital cameras, and video game equipments, to have an audio function. A sound emitter such as a speaker and/or a sound receiver such as a microphone is placed as an audio part inside a housing of an electronic device having an audio function. An opening is usually provided in the housing of the electronic device at an appropriate position relative to the audio part. Sound is transmitted between the outside of the electronic device and the audio part through this opening.

Obviously, entry of water into the housing of the electronic device must be prevented; however, the above-described opening for sound transmission may constitute a route that allows water to easily enter the housing. Especially for portable electronic devices, the risk of water entry is high because they are often exposed to rain or water used in daily life and because the orientation of the opening cannot be fixed at a specific orientation that allows the avoidance of water (for example, a downward orientation for which rain is less likely to come into the housing). Accordingly, a waterproof sound-transmitting membrane that allows sound to be transmitted between the audio part and the outside of the housing and that prevents water from entering the housing from outside through the opening is placed so as to cover the opening.

An example of the waterproof sound-transmitting membrane is a stretched porous membrane having a structure in which a huge number of pores formed by stretching are distributed. Patent Literature 1 discloses a waterproof sound-transmitting membrane including a stretched porous membrane of polytetrafluoroethylene (PTFE) or ultrahigh molecular weight polyethylene. Another example of the waterproof sound-transmitting membrane is a non-porous resin film having formed therein a plurality of through holes extending through the thickness of the film (see Patent Literature 2).

CITATION LIST

Patent Literature

Patent Literature 1: JP 2003-53872 A
Patent Literature 2: JP 2012-195928 A

SUMMARY OF INVENTION

Technical Problem

In recent years, there has been a trend for the openings to be made smaller in size than ever before, because of the decreasing available space associated with the reduction in size and thickness of electronic devices and in view of the appearance of the devices that has a significant influence on the sale of the devices. This trend is strong especially for portable electronic devices. The reduction in size of the opening results in a reduction in size (effective area) of the waterproof sound-transmitting membrane, and this reduction in effective area leads to deterioration in characteristics of sound transmitted through the waterproof sound-transmitting membrane. Patent Literature 1 and 2 discuss the acoustic characteristics only for large effective areas of 280×280 mm$^2$ (paragraph 0030 of Patent Literature 1) and 13 mm dia (=133 mm$^2$, paragraph 0041 of Patent Literature 2), respectively, and these literature nowhere disclose any approach to keeping the characteristics of sound transmitted through a waterproof sound-transmitting membrane when the membrane has a reduced effective area.

An object of the present invention is to provide a waterproof sound-transmitting membrane that prevents entry of water from outside and that can keep the characteristics of sound transmitted through the membrane even when having a reduced effective area.

Solution to Problem

A waterproof sound-transmitting membrane of the present disclosure includes: a non-porous resin film having formed therein a plurality of through holes extending through a thickness of the non-porous resin film; and a liquid-repellent layer formed on a principal surface of the resin film and having openings at positions corresponding to positions of the plurality of through holes. The through holes have a diameter of 4.0 µm or more and 12.0 µm or less, and the waterproof sound-transmitting membrane has a through-thickness air permeability of 2.0 cm$^3$/(cm$^2$·second) or more and 50 cm$^3$/(cm$^2$·second) or less in terms of Frazier number as measured according to JIS L 1096.

A waterproof sound-transmitting member of the present disclosure includes the above-specified waterproof sound-transmitting membrane of the present disclosure and a support member joined to the waterproof sound-transmitting membrane.

An electronic device of the present disclosure includes: a housing containing an audio part and provided with an opening for allowing sound to be transmitted between the audio part and an outside of the housing; and a waterproof sound-transmitting membrane placed so as to cover the opening, the waterproof sound-transmitting membrane capable of allowing sound to be transmitted between the audio part and the outside and of preventing water from entering the housing from the outside through the opening. The waterproof sound-transmitting membrane is the above-specified waterproof sound-transmitting membrane of the present disclosure.

An electronic device case of the present disclosure is an electronic device case designed to contain an electronic device having an audio part, and includes: an opening provided to allow sound to be transmitted between the audio part of the electronic device and an outside of the case; and a waterproof sound-transmitting membrane placed so as to cover the opening, the waterproof sound-transmitting membrane capable of allowing sound to be transmitted between the audio part of the electronic device and the outside and of preventing water from entering the case from the outside through the opening. The waterproof sound-transmitting membrane is the above-specified waterproof sound-transmitting membrane of the present disclosure.

A waterproof sound-transmitting structure of the present disclosure includes: a housing provided with an opening for allowing sound to be transmitted between an inside and an outside of the housing; and a waterproof sound-transmitting membrane placed so as to cover the opening, the waterproof sound-transmitting membrane capable of allowing sound to be transmitted between the inside and the outside and of preventing water from entering the inside from the outside through the opening. The waterproof sound-transmitting membrane is the above-specified waterproof sound-transmitting membrane of the present disclosure.

Advantageous Effects of Invention

With the present invention, it is possible to obtain a waterproof sound-transmitting membrane that prevents entry of water from outside and that can keep the characteristics of sound transmitted through the membrane even when having a reduced effective area.

DESCRIPTION OF EMBODIMENTS

Figure 1A:
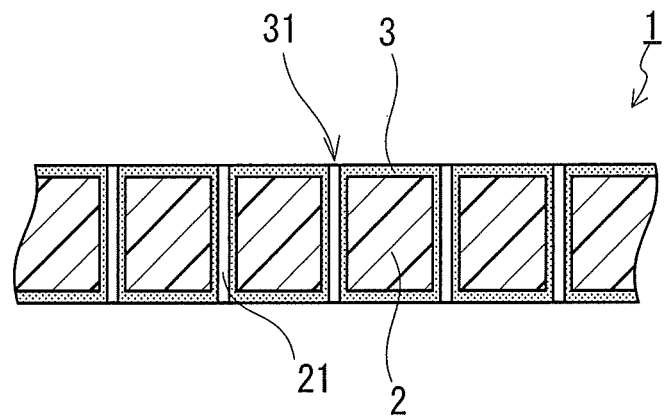
FIG. 1A is a cross-sectional view schematically showing an example of the waterproof sound-transmitting membrane of the present disclosure.

A first aspect of the present disclosure provides a waterproof sound-transmitting membrane including: a non-porous resin film having formed therein a plurality of through holes extending through a thickness of the non-porous resin film; and a liquid-repellent layer formed on a principal surface of the resin film and having openings the position of each of which corresponds to the position of one of the plurality of through holes. The through holes have a diameter of 4.0 μm or more and 12.0 μm or less, and the waterproof sound-transmitting membrane has a through-thickness air permeability of 2.0 cm$^3$/(cm$^2$·second) or more and 50 cm$^3$/(cm$^2$·second) or less in terms of Frazier number as measured according to JIS L 1096.

A second aspect of the present disclosure provides the waterproof sound-transmitting membrane as set forth in the first aspect, the waterproof sound-transmitting membrane having an effective area of 4.9 mm$^2$ or less.

A third aspect of the present disclosure provides the waterproof sound-transmitting membrane as set forth in the first aspect, wherein a sound pressure loss at frequencies ranging from 100 Hz to 3 kHz is 1 dB or less when the waterproof sound-transmitting membrane has an effective area of 4.9 mm$^2$.

A fourth aspect of the present disclosure provides the waterproof sound-transmitting membrane as set forth in the first aspect, wherein a sound pressure loss at frequencies ranging from 100 Hz to 3 kHz is 10 dB or less when the waterproof sound-transmitting membrane has an effective area of 0.8 mm$^2$ or less.

A fifth aspect of the present disclosure provides the waterproof sound-transmitting membrane as set forth in any one of the first to fourth aspects, wherein a water entry pressure as measured according to Method B (high hydraulic pressure method) of water penetration test specified in JIS L 1092 is 10 kPa or more.

A sixth aspect of the present disclosure provides the waterproof sound-transmitting membrane as set forth in any one of the first to fifth aspects, wherein the through holes are distributed at a density of 3×10$^5$ holes/cm$^2$ or more and 4×10$^6$ holes/cm$^2$ or less in the resin film.

A seventh aspect of the present disclosure provides the waterproof sound-transmitting membrane as set forth in any one of the first to sixth aspects, wherein the resin film is formed of a resin that can be etched with an alkaline solution or an oxidant solution.

An eighth aspect of the present disclosure provides the waterproof sound-transmitting membrane as set forth in any one of the first to sixth aspects, wherein the resin film is formed of at least one resin selected from polyethylene terephthalate, polycarbonate, polyimide, polyethylene naphthalate, and polyvinylidene fluoride.

A ninth aspect of the present disclosure provides the waterproof sound-transmitting membrane as set forth in any one of the first to eighth aspects, the waterproof sound-transmitting membrane being subjected to coloring treatment so as to be capable of absorbing light included in a wavelength range from 380 nm to 500 nm.

A tenth aspect of the present disclosure provides the waterproof sound-transmitting membrane as set forth in any one of the first to eighth aspects, the waterproof sound-transmitting membrane being colored black, gray, brown, or pink.

An eleventh aspect of the present disclosure provides a waterproof sound-transmitting member including: the waterproof sound-transmitting membrane as set forth in any one of the first to tenth aspects; and a support member joined to the waterproof sound-transmitting membrane.

A twelfth aspect of the present disclosure provides an electronic device including: a housing containing an audio part and provided with an opening for allowing sound to be transmitted between the audio part and an outside of the housing; and a waterproof sound-transmitting membrane placed so as to cover the opening, the waterproof sound-transmitting membrane capable of allowing sound to be transmitted between the audio part and the outside and of preventing water from entering the housing from the outside through the opening. The waterproof sound-transmitting membrane is the waterproof sound-transmitting membrane as set forth in any one of the first to tenth aspects.

A thirteenth aspect of the present disclosure provides an electronic device case designed to contain an electronic device having an audio part, the electronic device case including: an opening provided to allow sound to be transmitted between the audio part of the electronic device and an outside of the case; and a waterproof sound-transmitting membrane placed so as to cover the opening, the waterproof sound-transmitting membrane capable of allowing sound to be transmitted between the audio part of the electronic device and the outside and of preventing water from entering the case from the outside through the opening. The waterproof sound-transmitting membrane is the waterproof sound-transmitting membrane as set forth in any one of the first to tenth aspects.

A fourteenth aspect of the present disclosure provides a waterproof sound-transmitting structure including: a housing provided with an opening for allowing sound to be transmitted between an inside and an outside of the housing; and a waterproof sound-transmitting membrane placed so as to cover the opening, the waterproof sound-transmitting membrane capable of allowing sound to be transmitted between the inside and the outside and of preventing water from entering the inside from the outside through the opening. The waterproof sound-transmitting membrane is the waterproof sound-transmitting membrane as set forth in any one of the first to tenth aspects.

Hereinafter, the present invention will be described with reference to the drawings.

[Waterproof Sound-Transmitting Membrane]

An example of the waterproof sound-transmitting membrane of the present disclosure is shown in FIG. 1A. The waterproof sound-transmitting membrane 1 shown in FIG. 1A includes a non-porous resin film 2 and a liquid-repellent layer 3 formed on the principal surfaces of the resin film 2. In the resin film 2, a plurality of through holes 21 extending through the thickness of the resin film 2 are formed. The liquid-repellent layer 3 has openings 31 at positions corresponding to those of the through holes 21 of the resin film 2. The resin film 2 is a non-porous resin film having no other routes that allow through-thickness air permeation than the through holes 21, and is typically an imperforate (solid) resin film having no other holes than the through holes 21. The through holes 21 have openings at both principal surfaces of the resin film 2.

The shape of the through holes 21 is not particularly limited. The shape of the openings of the through holes 21 may be, for example, a circular shape or an indefinite shape. The through holes 21 are, for example, straight holes extending straight through the resin film 2. In this case, the through holes 21 may be straight holes having a diameter that is substantially constant from one principal surface to the other principal surface of the resin film 2. The through holes 21 as straight holes can be formed, for example, by ion beam irradiation and etching of a resin film serving as a base film. The ion beam irradiation and etching allow a large number of the through holes 21 having uniform opening diameters and uniform axial directions (directions in which the through holes extend) to be formed in the resin film 2.

Figure 1B:
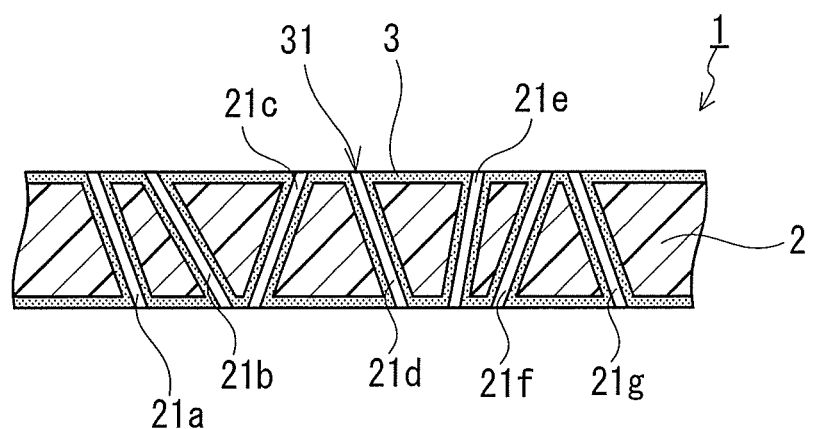
FIG. 1B is a cross-sectional view schematically showing another example of the waterproof sound-transmitting membrane of the present disclosure.

In the example shown in FIG. 1A, the direction in which the through holes 21 extend is a direction perpendicular to the principal surfaces of the resin film 2. The direction in which the through holes 21 extend may be inclined with respect to the direction perpendicular to the principal surfaces of the resin film 2, as long as the through holes 21 pass through the thickness of the resin film 2. As shown in FIG. 1B, the resin film 2 may have through holes 21 (21a to 21g) extending in directions inclined with respect to the direction perpendicular to the principal surfaces of the film, and the through holes 21a to 21g extending in different inclined directions may be present together in the resin film 2. In the example shown in FIG. 1B, the through holes 21 each extend (pass through the resin film 2) in a direction inclined with respect to the direction perpendicular to the principal surfaces of the resin film 2, and there is a combination of through holes 21 that extend in different directions from each other. In this case, the resin film 2 may have a combination of through holes 21 that extend in the same direction (in the example shown in FIG. 1B, the through holes 21a, 21d, and 21g extend in the same direction). Such a waterproof sound-transmitting membrane 1 as thus far described can have higher levels of both acoustic characteristics and water entry pressure than conventional membranes. The resin film 2 may have both through holes 21 that extend in the direction perpendicular to the principal surfaces of the film and through holes 21 that extend in a direction inclined with respect to the perpendicular direction.

The through holes 21 have a diameter (opening diameter) of 4.0 µm or more and 12.0 µm or less. The diameter of the through holes 21 needs to fall within this range in order to obtain a waterproof sound-transmitting membrane that prevents entry of water from outside and that can keep the characteristics of sound transmitted through the membrane even when having a reduced effective area. If the diameter of the through holes 21 is less than 4.0 µm, the characteristics of sound transmitted through the waterproof sound-transmitting membrane cannot be kept when the membrane has a reduced effective area. On the other hand, if the diameter of the through holes 21 is more than 12.0 µm, entry of water from outside cannot be prevented. The diameter of the through holes 21 is preferably 4.5 µm or more and 12.0 µm or less, and more preferably 5.0 µm or more and 11.0 µm or less.

The diameter of the through holes 21 refers to the diameter of a circle, assuming that the cross-sectional shape (e.g., the shape of the openings) of the through holes 21 corresponds to the circle. When the through holes 21 extend in a direction inclined with respect to the direction perpendicular to the principal surfaces of the resin film 2, the shape of their openings is typically an ellipse. Even in this case, the cross-sectional shape (the shape of a cross-section taken perpendicular to the direction in which the through holes 21 extend) of the through holes 21 can be assumed to be a circle inside the resin film 2, similarly to that of the through holes 21 extending in the direction perpendicular to the principal surfaces of the resin film 2, and the diameter of this circle is equal to the minimum diameter of the ellipse that is the shape of the openings. Therefore, for the through holes 21 extending in an inclined direction, the minimum diameter can be defined as the diameter of the through holes. All of the through holes 21 present in the resin film 2 need not have exactly equal diameters; however, in the effective portion of the resin film 2, it is preferable for the through holes 21 to have such uniform diameters that the diameters can be considered substantially equal (e.g., the standard deviation is 10% or less of the average value). The diameter of the through holes 21 can be adjusted depending on the period of time for etching of the base film and/or the concentration of the etching treatment liquid.

The waterproof sound-transmitting membrane 1 has a through-thickness air permeability of 2.0 $cm^3/(cm^2 \cdot second)$ or more and 50 $cm^3/(cm^2 \cdot second)$ or less in terms of Frazier number as measured according to JIS L 1096 (hereinafter simply referred to as "Frazier number"). Taking into account the fact that the liquid-repellent layer 3 has almost no influence on the air permeability, the resin film 2 can have a through-thickness air permeability of 2.0 $cm^3/(cm^2 \cdot second)$ or more and 50 $cm^3/(cm^2 \cdot second)$ or less in terms of Frazier number. In order to obtain a waterproof sound-transmitting membrane that prevents entry of water from outside and that can keep the characteristics of sound transmitted through the membrane even when having a reduced effective area, it is necessary not only that the diameter of the through holes 21 of the resin film 2 should fall within a specific range but also that the through-thickness air permeability of the waterproof sound-transmitting membrane 1 should fall within the above-specified range. If the air permeability is less than 2.0 $cm^3/(cm^2 \cdot second)$ in terms of Frazier number, the characteristics of sound transmitted through the waterproof sound-transmitting membrane cannot be kept when the membrane has a reduced effective area. On the other hand, if the air permeability is more than 50 $cm^3/(cm^2 \cdot second)$, the risk of entry of water from outside may be increased although it depends on the porosity of the waterproof sound-transmitting membrane. The air permeability is 5.0 $cm^3/(cm^2 \cdot second)$ or more and 50 $cm^3/(cm^2 \cdot second)$ or less, and more preferably 11 $cm^3/(cm^2 \cdot second)$ or more and 50 $cm^3/(cm^2 \cdot second)$ or less, in terms of Frazier number.

The porosity of the resin film 2 is preferably 25% or more and 45% or less, and more preferably 30% or more and 40% or less. By adjusting the porosity within this range in addition to adjusting the diameter of the through holes 21 and the through-thickness air permeability within the above-specified ranges, it is possible to further ensure the provision of a waterproof sound-transmitting membrane that prevents entry of water from outside and that can keep the characteristics of sound transmitted through the membrane even when having a reduced effective area. Since the resin film 2 is a non-porous film having formed therein a plurality of through holes extending through the thickness of the film, its porosity corresponds to the ratio of the total of the areas of the openings of the through holes 21 opening at a principal surface of the resin film 2 to the area of the principal surface.

The density of the through holes 21 (hole density) in the resin film 2 is preferably $3 \times 10^5$ holes/$cm^2$ or more and $4 \times 10^6$ holes/$cm^2$ or less, and more preferably $5 \times 10^5$ holes/$cm^2$ or more and $2 \times 10^6$ holes/$cm^2$ or less. The waterproof sound-transmitting membrane 1 of the present disclosure is designed so that the diameter of the through holes 21 is larger than, and the hole density is smaller than, those in a conventional membrane even when, for example, the membrane 1 has the same porosity as the conventional membrane. The hole density need not be constant over the entire resin film 2; however, in the effective portion of the resin film 2, the hole density is preferably so uniform that the maximum hole density is 1.5 times or less the minimum hole density. The hole density can be adjusted depending on the amount of ions applied at the time of irradiation of a base film with an ion beam.

The thickness of the resin film 2 is, for example, 10 μm or more and 100 μm or less, and preferably 15 μm or more and 50 μm or less.

The material forming the resin film 2 is not particularly limited, as long as the material allows the formation of the through holes 21 in a non-porous resin film serving as a base film. For example, the resin film 2 is formed of a resin that can be degraded by an alkaline solution, an acidic solution, or an alkaline or acidic solution to which has been added at least one selected from an oxidant, an organic solvent, and a surfactant. In this case, the formation of the through holes 21 in the base film by ion beam irradiation and etching is made easier. From another aspect, the resin film 2 is formed of, for example, a resin that can be etched by hydrolysis or oxidative degradation. The resin film 2 can be formed of a resin that can be etched with an alkaline solution or an oxidant solution. A commercially-available film can be used as the base film.

The resin film 2 is formed of, for example, at least one resin selected from polyethylene terephthalate (PET), polycarbonate, polyimide, polyethylene naphthalate, and polyvinylidene fluoride.

For the etching for forming the through holes 21, an etching treatment liquid is selected depending on the material forming the resin film 2. The etching treatment liquid is, for example, an alkaline solution, an acidic solution, or an alkaline or acidic solution to which has been added at least one selected from an oxidant, an organic solvent, and a surfactant. The etching treatment liquid can be an alkaline solution or an oxidant solution. The alkaline solution is, for example, a solution containing potassium hydroxide and/or sodium hydroxide as a main component, and may further contain an oxidant. The resin forming the base film can be hydrolyzed by the use of an alkaline solution. The oxidant solution is, for example, a solution containing as a main component at least one selected from chlorous acid, chlorite, hypochlorous acid, hypochlorite, hydrogen peroxide, and potassium permanganate. The resin forming the base film may be oxidatively degraded by the use of an oxidant solution. Examples of the combination of the etching treatment liquid and the resin forming the resin film 2 and the base film include: combinations of PET, polycarbonate, or polyethylene naphthalate with an alkaline solution (e.g., a solution containing sodium hydroxide as a main component); and combinations of polyimide or polyvinylidene fluoride with an oxidant solution (e.g., a solution containing sodium hypochlorite as a main component).

A commercially-available film can be used as the resin film 2 having the through holes 21. For example, such commercially-available films are sold by Oxyphen AG and Millipore Corporation as membrane filters.

The waterproof sound-transmitting membrane 1 may have two or more layers of the resin film 2. Such a waterproof sound-transmitting membrane 1 can be formed, for example, by ion beam irradiation and etching of a laminate having two or more layers of a base film.

The liquid-repellent layer 3 is a layer having water repellency, and preferably has oil repellency as well. The liquid-repellent layer 3 has the openings 31 at positions corresponding to those of the through holes 21 of the resin film 2.

The liquid-repellent layer 3 is formed on the principal surface of the resin film 2. It is only necessary that the liquid-repellent layer 3 be formed on at least one principal surface of the resin film 2.

Such a liquid-repellent layer 3 can be formed, for example, as follows: a treatment liquid prepared by diluting a water-repellent agent or a hydrophobic oil-repellent agent with a diluent is thinly applied to and dried on the resin film 2. Examples of the water-repellent agent and the hydrophobic oil-repellent agent include perfluoroalkyl acrylate and perfluoroalkyl methacrylate. The thickness of the liquid-repellent layer 3 is preferably less than ½ of the diameter of the through holes 21.

Figure 2:
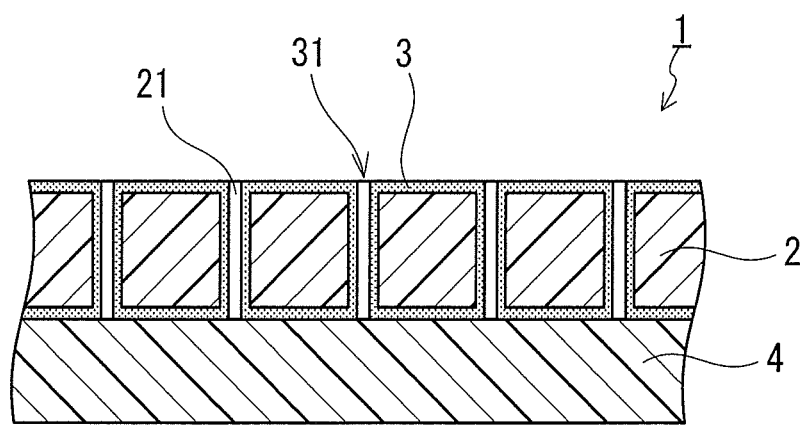
FIG. 2 is a cross-sectional view schematically showing still another example of the waterproof sound-transmitting membrane of the present disclosure.

In the case where the liquid-repellent layer 3 is formed by thinly applying the treatment liquid onto the resin film 2, the inner circumferential surfaces of the through holes 21 also can be, depending on the diameter of the through holes 21, coated with liquid-repellent layers extending continuously from the liquid-repellent layer 3 (such a situation is seen in the examples shown in FIGS. 1A, 1B, and 2). In this case, the diameter of the through holes 21 is reduced by the thickness of the liquid-repellent layers, as compared with their original diameter.

The waterproof sound-transmitting membrane 1 may include any other member than the resin film 2 and the liquid-repellent layer 3 as long as the effects of the present invention are obtained. Such a member is, for example, an air-permeable support layer 4 shown in FIG. 2. The waterproof sound-transmitting membrane 1 shown in FIG. 2 further includes the air-permeable support layer 4 placed on the side of one principal surface of the resin film 2 of the waterproof sound-transmitting membrane 1 shown in FIG. 1A. Placing the air-permeable support layer 4 enhances the strength of the waterproof sound-transmitting membrane 1, and improves its handling properties.

The air-permeable support layer 4 is a layer having a higher through-thickness air permeability than the resin film 2. For example, a woven fabric, a non-woven fabric, a net, or a mesh can be used as the air-permeable support layer 4. The material forming the air-permeable support layer 4 is, for example, polyester, polyethylene, or aramid resin. As shown in FIG. 2, the air-permeable support layer 4 may be placed on the principal surface of the resin film 2 on which the liquid-repellent layer 3 is formed, with the liquid-repellent layer 3 interposed between the resin film 2 and the formed air-permeable support layer 4. The shape of the air-permeable support layer 4 may be the same as or different from the shape of the resin film 2. For example, the air-permeable support layer 4 can have a shape adapted for placement only to the peripheral region of the resin film 2 (specifically, a ring shape adapted for placement only to the peripheral region of the resin film that has a circular shape).

The air-permeable support layer 4 is placed, for example, by a technique such as thermal welding or bonding by an adhesive to the resin film 2.

The air-permeable support layer 4 may be placed on one principal surface of the resin film 2 or may be placed on each principal surface of the resin film 2.

For example, the waterproof sound-transmitting membrane 1 is placed so as to cover an opening of a housing of an electronic device, prevents water from entering the inside of the housing through the opening, and also allows sound to be transmitted between the outside and inside of the housing. More specifically, for example, when an electronic device has an audio part as exemplified by a sound emitter such as a speaker and/or a sound receiver such as a microphone and also has a housing provided with an opening (an opening portion) for allowing sound transmission to or from the audio part, the waterproof sound-transmitting membrane 1 is used as a membrane that is placed so as to cover the opening, and prevents water from entering the inside of the electronic device through the opening while allowing sound to be transmitted between the outside of the electronic device and the audio part.

The waterproof sound-transmitting membrane 1 can keep the characteristics of sound transmitted through the membrane even when having a reduced effective area. For example, the effective area of the waterproof sound-transmitting membrane 1 may be 4.9 mm$^2$ or less. Also in this case, the characteristics of sound transmitted through the membrane can be kept. This advantageous feature contributes to, for example, reduction in size, reduction in thickness, and increase in variability of appearance and design, of an electronic device equipped with the waterproof sound-transmitting membrane 1. The effective area of the waterproof sound-transmitting membrane 1 means the area of a portion (effective portion) of the membrane through which sound actually enters the membrane, travels in the membrane, and exits the membrane when the membrane is placed so as to cover the opening of the housing. For example, the effective area does not include the area of a support member or a bonding portion placed or formed on the peripheral region of the waterproof sound-transmitting membrane 1 for placement of the membrane. The effective area can typically be equal to the area of the opening over which the membrane is placed. In the case of a waterproof sound-transmitting member in which a support member is placed on the peripheral region of the waterproof sound-transmitting membrane, the effective area can typically be equal to the area of an opening portion of the support member.

Specifically, when the waterproof sound-transmitting membrane 1 has an effective area of 4.9 mm$^2$ (e.g., when the membrane has the shape of a circle of 2.5 mm diameter), the sound pressure loss at frequencies ranging from 100 Hz to 3 kHz can be 1 dB or less. The frequencies ranging from 100 Hz to 3 kHz are those that humans use in their usual vocalization and conversation, and also correspond to those that humans can perceive most sensitively when music or the like is reproduced. The small sound pressure loss at these frequencies contributes to increasing the market appeal of an electronic device equipped with the waterproof sound-transmitting membrane 1.

The smaller the effective area is, the poorer the characteristics of sound transmitted through the waterproof sound-transmitting membrane are, and, more specifically, the greater the sound pressure loss is, for example. However, the waterproof sound-transmitting membrane 1 can keep the sound pressure loss at the frequencies ranging from 100 Hz to 3 kHz equal to or less than 10 dB even when the membrane has an effective area of 0.8 mm² or less (e.g., when the membrane has the shape of a circle of 1 mm diameter).

Naturally, not only when the effective area of the waterproof sound-transmitting membrane 1 is small but also when the effective area is large, the membrane can keep the characteristics of sound transmitted through the membrane while preventing entry of water from outside. The waterproof sound-transmitting membrane 1 of the present disclosure is advantageous especially when a waterproof sound-transmitting membrane having a small effective area is used or has to be used.

The waterproof sound-transmitting membrane 1 has a water entry pressure of preferably 5 kPa or more, more preferably 10 kPa or more, as measured according to Method B (high hydraulic pressure method) of water penetration test specified in JIS L 1092. Having a water entry pressure of 10 kPa means capable of withstanding a water pressure at a water depth of 1 m. In this case, water resistance corresponding to "the degree of protection against water 7 (IPX-7)" as specified in JIS C 0920 can be ensured. An electronic device rated as IPX-7 can avoid entry of water into the device even when accidentally dropped into water, insofar as the water depth and the duration of submergence fall within given limits. It has been empirically found that when the water entry pressure is around 5 kPa, waterproofness corresponding to "the degree of protection against water 4 (IPX-4)" as specified in JIS C 0920 can be ensured. IPX-4 is also one of the degrees of waterproofness that has recently been required of electronic devices. When the water entry pressure of the waterproof sound-transmitting membrane 1 is 5 kPa or more or 10 kPa or more, both waterproofness corresponding to IPX-4 or IPX-7 and excellent acoustic characteristics can be achieved, and an electronic device that has a higher variability of appearance and design can be obtained; for example, it is possible to obtain an electronic device that is less restricted in terms of the space for the opening for an audio part and that can be reduced in size and/or thickness.

The surface density of the waterproof sound-transmitting membrane 1 is preferably 5 to 100 g/m², and more preferably 10 to 50 g/m², from the viewpoint of the strength, handling properties, and acoustic characteristics of the membrane. In the case where a stretched porous membrane as disclosed in Patent Literature 1 which has a structure in which a huge number of pores formed by stretching are distributed is used as a waterproof sound-transmitting membrane, its surface density needs to be small from the viewpoint of keeping the acoustic characteristics. However, a membrane having a small surface density is poor in strength and in handling properties including production yield and attachment accuracy. Also in this respect, the waterproof sound-transmitting membrane 1 is advantageous.

The thickness of the waterproof sound-transmitting membrane 1 is, for example, 10 to 100 μm, and preferably 15 to 50 μm.

The waterproof sound-transmitting membrane 1 may be subjected to coloring treatment. Depending on the material forming the resin film 2, the waterproof sound-transmitting membrane 1 not subjected to coloring treatment is, for example, transparent or white. When such a waterproof sound-transmitting membrane 1 is placed so as to cover an opening of a housing of an electronic device, the membrane 1 may be conspicuous. Such a conspicuous membrane may stimulate the curiosity of a user of the electronic device, leading to impairment of the function of the waterproof sound-transmitting membrane caused by stabbing with a needle or the like. In the case where the waterproof sound-transmitting membrane 1 has been subjected to coloring treatment so that, for example, the membrane 1 has a color that is the same as or similar to the color of the housing, attraction for the user can be relatively reduced. Also, in some cases, a colored waterproof sound-transmitting membrane is required in view of the appearance of a housing of an electronic device or the like. Such appearance requirements can be met by means of coloring treatment.

The coloring treatment can be carried out, for example, by dyeing the resin film 2 or by having the resin film 2 contain a colorant. The coloring treatment may be carried out, for example, so that light included in the wavelength range from 380 nm to 500 nm is absorbed. That is, the waterproof sound-transmitting membrane 1 may be subjected to coloring treatment so as to be capable of absorbing light included in the wavelength range from 380 nm to 500 nm. To this end, for example, the resin film 2 contains a colorant having the capability to absorb light included in the wavelength range from 380 nm to 500 nm or is dyed with a dye having the capability to absorb light included in the wavelength range from 380 nm to 500 nm. In this case, the waterproof sound-transmitting membrane 1 can be colored blue, gray, brown, pink, green, yellow, or the like. The waterproof sound-transmitting membrane 1 may be colored black, gray, brown, or pink by coloring treatment.

The waterproof sound-transmitting membrane 1 can be used in a variety of applications, such as in a waterproof sound-transmitting member, an electronic device, an electronic device case, and a waterproof sound-transmitting structure.

[Waterproof Sound-Transmitting Member]

Figure 3:
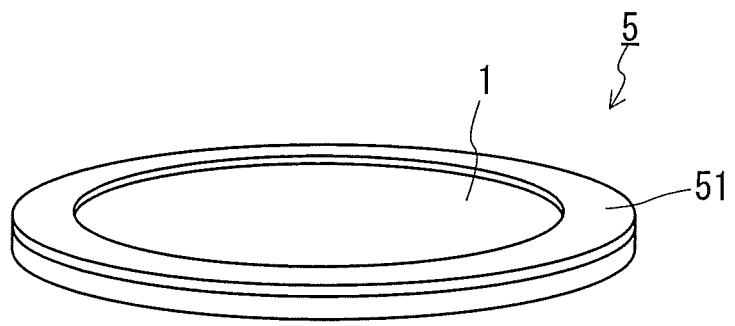
FIG. 3 is a perspective view schematically showing an example of the waterproof sound-transmitting member of the present disclosure.

An example of the waterproof sound-transmitting member of the present disclosure is shown in FIG. 3. The waterproof sound-transmitting member 5 shown in FIG. 3 includes: the waterproof sound-transmitting membrane 1 that has a circular shape when viewed in a direction perpendicular to the principal surfaces of the membrane; and a support member 51 that is a ring-shaped sheet and joined to the peripheral region of the membrane 1. With this configuration in which the support member 51 is joined to the waterproof sound-transmitting membrane 1, the waterproof sound-transmitting membrane 1 is reinforced, and its handling properties are improved. In addition, when the waterproof sound-transmitting member 5 is placed to an object such as an opening of a housing, the support member 51 serves as a portion attached to the object; therefore, the placement of the waterproof sound-transmitting membrane 1 is easier.

Figure 4:
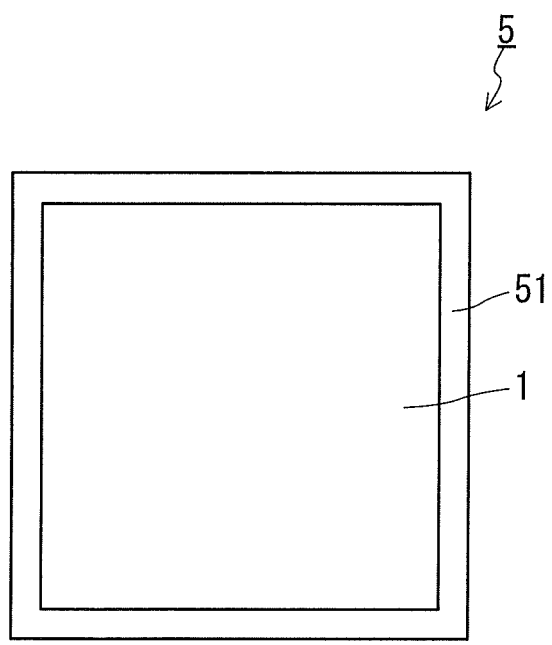
FIG. 4 is a plan view schematically showing another example of the waterproof sound-transmitting member of the present disclosure.

The shape of the support member 51 is not limited. For example, as shown in FIG. 4, the support member 51 may be a frame-shaped sheet joined to the peripheral region of the waterproof sound-transmitting membrane 1 that has a rectangular shape when viewed in the direction perpendicular to the principal surfaces of the membrane. By conforming the shape of the support member 51 to the shape of the peripheral region of the waterproof sound-transmitting membrane 1 as shown in FIGS. 3 and 4, the deterioration in acoustic characteristics of the waterproof sound-transmitting membrane 1 caused by placement of the support member 51 is reduced. It is preferable for the support member 51 to be in the form of a sheet, from the viewpoint of handling properties of the waterproof sound-transmitting member 5 and ease of placement to a housing, particularly from the viewpoint of increase in ease of placement inside the housing.

The material forming the support member 51 is, for example, a resin, a metal, or a composite material thereof. Examples of the resin include: polyolefins such as polyethylene and polypropylene; polyesters such as PET and polycarbonate; polyimides; and composite resins thereof. Examples of the metal include metals having excellent corrosion resistance, such as stainless steel and aluminum.

The thickness of the support member 51 is, for example, 5 to 500 μm, and preferably 25 to 200 μm. Particularly in view of its function as the portion for attachment, the ring width (or frame width: the difference between the outer size and inner size) is suitably about 0.5 to 2 mm. A foamed material made of any of the above-mentioned resins may be used as the support member 51.

The method for joining the waterproof sound-transmitting membrane 1 and the support member 51 together is not particularly limited. For example, techniques such as heat welding, ultrasonic welding, bonding by an adhesive, and bonding by a double-faced tape, can be employed.

The waterproof sound-transmitting member 5 may include two or more layers of the waterproof sound-transmitting membrane 1 and/or two or more layers of the support member 51.

The waterproof sound-transmitting member 5 can be used in the same applications as conventional waterproof sound-transmitting members.

[Electronic Device]

Figure 5A:
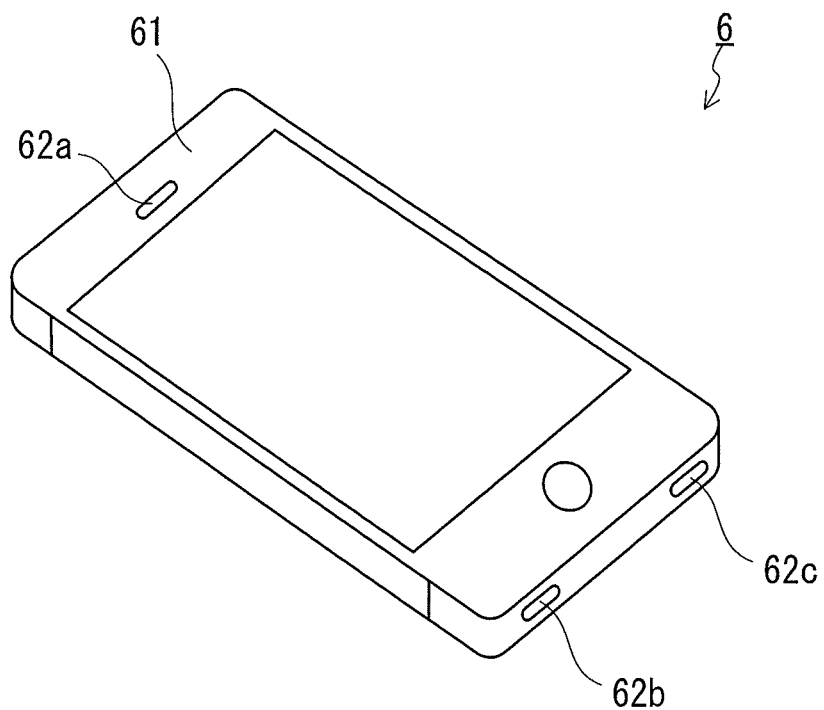
FIG. 5A is a perspective view schematically showing an example of the electronic device of the present disclosure.
Figure 5B:
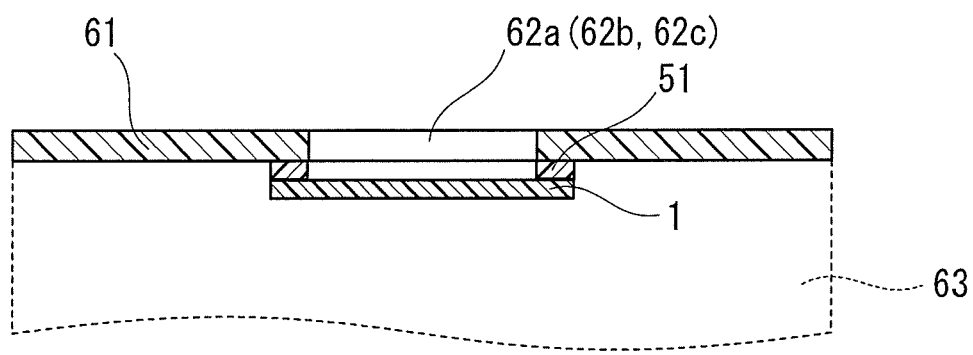
FIG. 5B is a cross-sectional view schematically showing an example of placement of a waterproof sound-transmitting membrane in the electronic device of the present disclosure.

An example of the electronic device of the present disclosure is shown in FIG. 5A. The electronic device shown in FIG. 5A is a smartphone which is a type of mobile phone. A housing 61 of the smartphone 6 has an opening 62a provided in proximity to a transducer which is a type of sound emitting-receiving device, an opening 62b provided in proximity to a microphone which is a type of sound receiver, and an opening 62c provided in proximity to a speaker which is a type of sound emitter. Sound is transmitted through the openings 62a to 62c between the outside of the smartphone 6 and the audio parts (transducer, microphone, and speaker) placed inside the housing 61. In the smartphone 6, as shown in FIG. 5B, the waterproof sound-transmitting membranes 1 are attached inside the housing 61 so as to cover these openings 62a to 62c. Thus, it is possible to allow sound to be transmitted between the outside of the smartphone 6 and the audio parts and also possible to prevent water from entering the housing 61 from the outside through the openings. In addition, since the waterproof sound-transmitting membrane 1 can keep the characteristics of sound transmitted through the membrane even when having a small effective area, it is possible to achieve reduction in size, reduction in thickness, and increase in variability of design and appearance for the smartphone 6.

The location and method for placing the waterproof sound-transmitting membranes 1 in the electronic device 6 of the present disclosure are not limited, as long as the openings (opening portions) provided in the housing 61 of the device 6 are covered by the waterproof sound-transmitting membranes 1. In the example shown in FIG. 5B, the waterproof sound-transmitting membrane 1 is joined to the housing 61 via the support member 51 (that is, a waterproof sound-transmitting member is joined). For the placement of the waterproof sound-transmitting membrane 1 inside the electronic device 6, techniques such as adhesion using a double-faced tape, thermal welding, high-frequency welding, and ultrasonic welding can be employed.

The housing 61 is formed of a resin, a metal, glass, or a composite material thereof. As in smartphones and tablet computers, the display of the electronic device 6 may constitute a part of the housing 61.

The electronic device of the present disclosure is not limited to the smartphone 6. Electronic devices that fall under the category of the electronic device of the present disclosure include all types of electronic devices that are equipped with an audio part, that have a housing provided with an opening for sound transmission between the outside and the audio part, that require prevention of entry of water into the housing through the opening, and that allow the waterproof sound-transmitting membrane 1 to be placed so as to cover the opening. Examples of the electronic device of the present disclosure include: mobile phones such as feature phones and smartphones; mobile computers such as tablet computers, wearable computers, PDAs, video game equipment, and notebook computers; electronic notebooks; digital cameras; video cameras; and electronic book readers.

[Electronic Device Case]

Figure 6A:
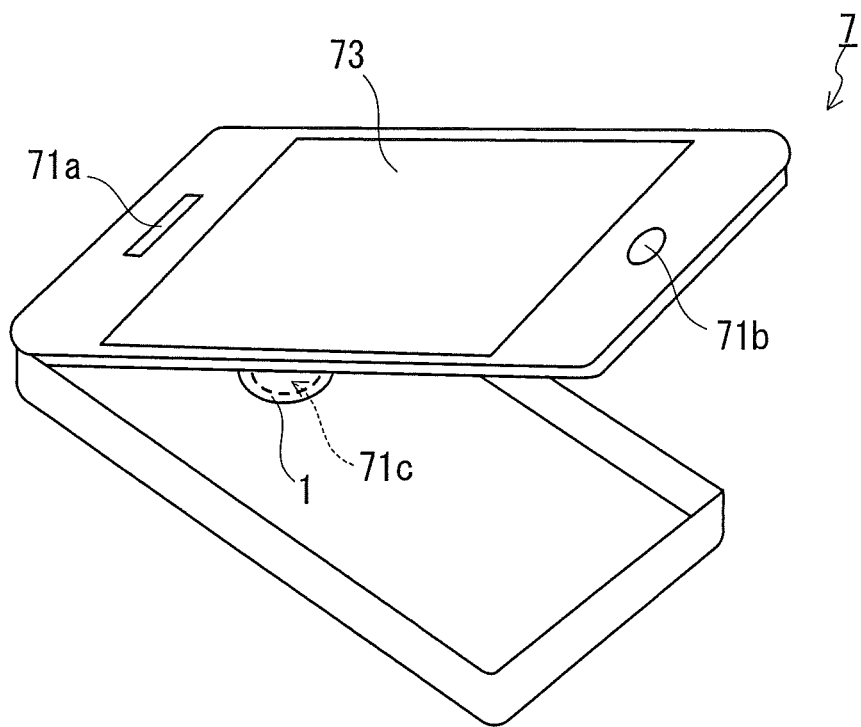
FIG. 6A is a perspective view schematically showing an example of the electronic device case of the present disclosure.
Figure 6B:
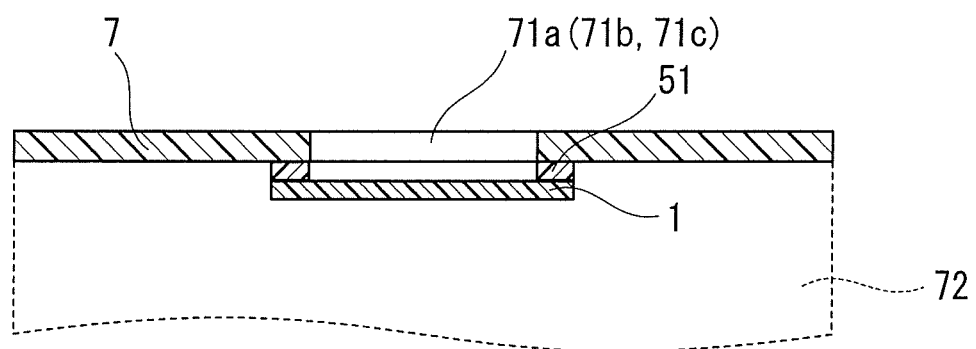
FIG. 6B is a cross-sectional view schematically showing an example of placement of a waterproof sound-transmitting membrane in the electronic device case of the present disclosure.

An example of the electronic device case of the present disclosure is shown in FIG. 6A. The case 7 shown in FIG. 6A is provided with openings 71a to 71c for allowing sound to be transmitted between audio parts of the electronic device placed inside the case 7 and the outside of the case 7. The case 7 shown in FIG. 6A is a case of a smartphone that is different in type from the smartphone 6 shown in FIG. 5A. The opening 71a is provided for sound transmission to the voice receiver of the smartphone, the opening 71b is provided for sound transmission to the voice transmitter of the smartphone, and the opening 71c is provided for sound transmission from the speaker of the smartphone to the outside. As shown in FIG. 6B, the case 7 further includes the waterproof sound-transmitting membrane 1 placed so as to cover the opening 71a (71b, 71c). This waterproof sound-transmitting membrane 1 allows sound to be transmitted between the audio part of the electronic device placed in an interior 72 of the case 7 and the outside of the case 7, and also can prevent water from entering the interior 72 of the case 7 and then the electronic device from the outside through the opening 71a (71b, 71c). In addition, since the waterproof sound-transmitting membrane 1 can keep the characteristics of sound transmitted through the membrane even when having a small effective area, it is possible to form the electronic device case 7 adapted for an electronic device that has a high variability of design and appearance and for which reduction in size and/or thickness has been achieved. Furthermore, the electronic device case 7 can be formed as one in which the opening 71a (71b, 71c) has a small area. Therefore, also for the case 7 itself, reduction in size, reduction in thickness, and increase in variability of design and appearance can be achieved.

The method for placing the waterproof sound-transmitting membrane 1 in the electronic device case 7 of the present disclosure is not limited, as long as the opening (opening portion) 71a (71b, 71c) is covered by the membrane 1. In the example shown in FIG. 6B, the waterproof sound-transmitting membrane 1 is joined to the case 7 in the interior 72 via the support member 51 (that is, a waterproof sound-transmitting member is joined). For the placement of the waterproof sound-transmitting membrane 1 in the case 7, techniques such as adhesion using a double-faced tape, thermal welding, high-frequency welding, and ultrasonic welding can be employed. The waterproof sound-transmitting membrane 1 may be placed on the exterior of the case 7.

The electronic device case 7 is formed of a resin, a metal, glass, or a composite material thereof. The electronic device case 7 may have any structure as long as the effects of the present invention are obtained. For example, the case 7 shown in FIG. 6A is a case for a smartphone, and includes a film 73 that allows external operation of a touch panel of the smartphone placed inside the case.

[Waterproof Sound-Transmitting Structure]

Figure 7:
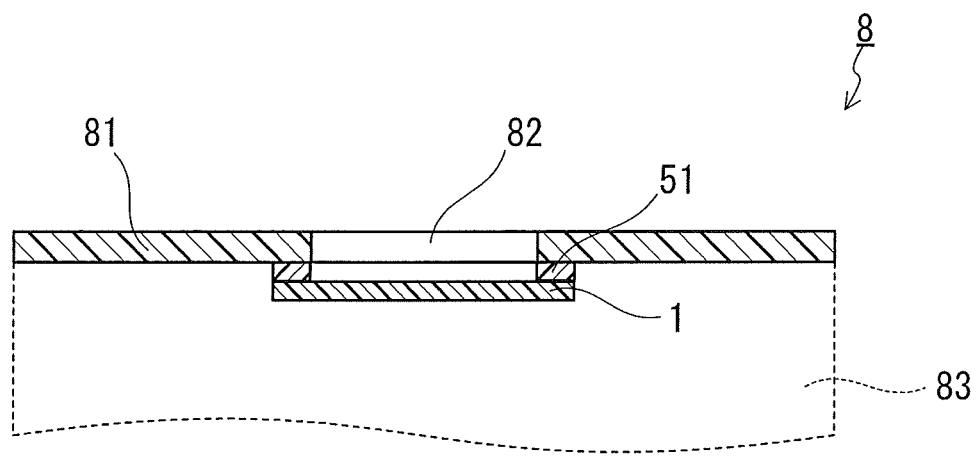
FIG. 7 is a cross-sectional view schematically showing an example of the waterproof sound-transmitting structure of the present disclosure.

An example of the waterproof sound-transmitting structure of the present disclosure is shown in FIG. 7. The waterproof sound-transmitting structure 8 shown in FIG. 7 includes: a housing 81 provided with an opening 82 for allowing sound to be transmitted between an interior 83 and the outside of the housing; and the waterproof sound-transmitting membrane 1 placed so as to cover the opening (opening portion) 82. This waterproof sound-transmitting membrane 1 allows sound to be transmitted between the outside and the interior 83 of the housing 81, and also can prevent water from entering the housing 81 from the outside through the opening 82. In addition, since the waterproof sound-transmitting membrane 1 can keep the characteristics of sound transmitted through the membrane even when having a small effective area, reduction in size of the waterproof sound-transmitting structure 8 itself can be achieved.

Such a waterproof sound-transmitting structure 8 can be used in a variety of applications. Particularly, the waterproof sound-transmitting structure 8 is effectively used in applications which are restricted in terms of the space available for waterproof sound-transmitting structures or applications for which it is desired to keep the characteristics of transmitted sound while preventing entry of water from outside.

In the example shown in FIG. 7, the waterproof sound-transmitting membrane 1 is joined to the housing 81 via the support member 51. In other words, the waterproof sound-transmitting member 5 including the waterproof sound-transmitting membrane 1 and the support member 51 is joined to the housing 81. In the example shown in FIG. 7, the waterproof sound-transmitting membrane 1 is joined to the housing 81 in the interior 83 of the housing 81; however, the membrane 1 may be joined to the exterior of the housing 81.

The housing 81 is formed of a resin, a metal, glass, or a composite material thereof.

For the placement of the waterproof sound-transmitting membrane 1, techniques such as adhesion using a double-faced tape, thermal welding, high-frequency welding, and ultrasonic welding can be employed. The support member 51 may be a double-faced tape.

A component, device, equipment, product or the like that can have the waterproof sound-transmitting structure 8 is not limited.

The waterproof sound-transmitting structure 12 can be used in a variety of applications similarly to conventional waterproof sound-transmitting structures.

EXAMPLES

Hereinafter, the present invention will be described more specifically with reference to examples. The present invention is not limited to the examples given below.

First, the methods for evaluating the resin films and waterproof sound-transmitting membranes fabricated in Examples and Comparative Examples will be described.

[Diameter of through Holes]

Both principal surfaces of each resin film were observed with a scanning electron microscope (SEM), 10 through holes were arbitrarily selected from the through holes captured in each of the obtained SEM images, and the diameters (opening diameters) of the selected through holes were determined based on the images. The average of the diameters was determined as the diameter of the through holes of the resin film.

[Average Pore Diameter]

The average pore diameters of stretched porous membranes used in the waterproof sound-transmitting membranes of Comparative Examples 4 and 5 were determined according to JIS K 3832.

[Air Permeability]

The through-thickness air permeability of each waterproof sound-transmitting membrane was determined according to JIS L 1096 (Method A of air permeability measurement: Frazier method).

[Water Entry Pressure]

The water entry pressure of each waterproof sound-transmitting membrane was determined according to Method B (high hydraulic pressure method) of water penetration test specified in JIS L 1092. When a test piece of the membrane has an area specified in this standard, the membrane undergoes a significant change in shape. Therefore, in order to reduce the change in shape of the membrane to some extent, a stainless steel mesh (opening diameter=2 mm) was placed on one side of the membrane opposite to its surface subjected to pressure, and in this state, the measurement was performed.

[Surface Density]

The surface density of each waterproof sound-transmitting membrane was determined by punching a 20-mm-diameter circular piece from the membrane with a, punch, measuring the mass of the punched piece of the membrane, and calculating the mass per 1 $m^2$.

[Porosity]

The porosities of the resin films and the stretched porous membranes of Comparative Examples 4 and 5 were each determined by multiplying the surface density determined as above by the thickness of the waterproof sound-transmitting membrane to determine the apparent density of the membrane and then by calculating the porosity based on the formula (1) using the apparent density and a material density. The waterproof sound-transmitting membranes fabricated in Examples and Comparative Examples did not have any air-permeable support layer, and were composed of a single-layer resin film or stretched porous membrane and a liquid-repellent layer.

$$\text{Porosity} = \{1-(\text{apparent density/material density})\} \times 100(\%) \quad (1)$$

The material density was assumed to be 1.4 $g/cm^3$ for PET and 2.2 $g/cm^3$ for PTFE.

[Hole Density]

The hole density of each resin film was determined by observing both principal surfaces of the resin film with a SEM, visually counting the number of the through holes captured in the obtained SEM images, and calculating the number per unit area.

[Oil Repellency]

The oil repellency of each waterproof sound-transmitting membrane was evaluated as follows. The waterproof sound-transmitting membrane and a sheet of copy paper (regular paper) were stacked in such a manner that the waterproof sound-transmitting membrane formed an upper layer and the sheet of copy paper formed an under layer. A drop of castor oil was applied to the waterproof sound-transmitting membrane with a dropper, and the stack was left for 1 minute. Thereafter, the waterproof sound-transmitting membrane was removed, and the condition of the sheet of copy paper was checked. In the case were the sheet of copy paper was wet with the castor oil, it was determined that the oil repellency was absent from the waterproof sound-transmitting membrane, while in the case were the sheet of copy paper was not wet, it was determined that the oil repellency was present in the waterproof sound-transmitting membrane.

[Acoustic Characteristics]

The acoustic characteristics (sound pressure loss) of the fabricated waterproof sound-transmitting membranes were evaluated as follows.

Figure 8A:
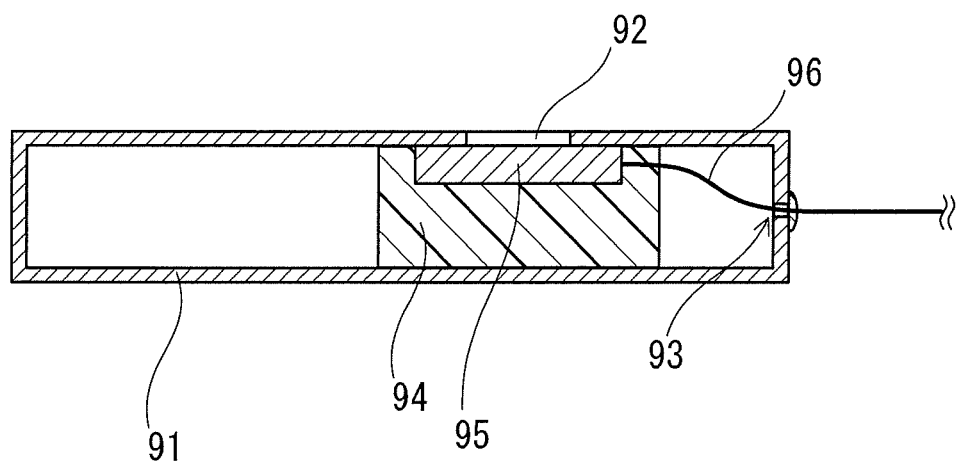
FIG. 8A is a cross-sectional view schematically showing a simulant housing used for evaluation of sound pressure loss of waterproof sound-transmitting membranes in Examples and showing placement of a speaker in the housing.
Figure 8B:
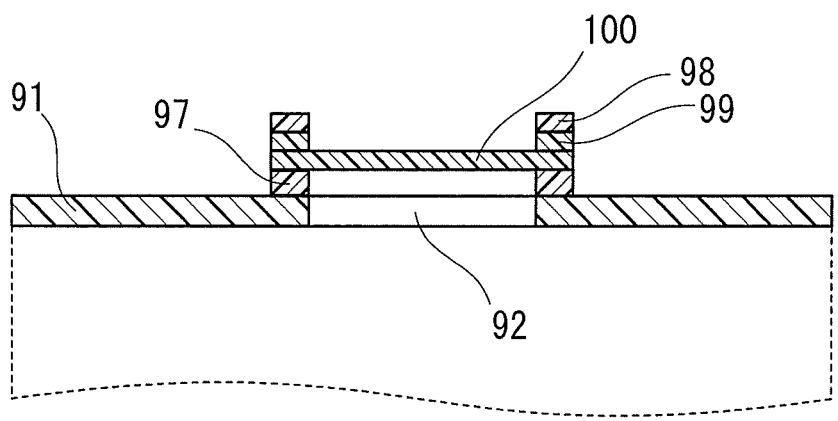
FIG. 8B is a cross-sectional view schematically showing a waterproof sound-transmitting member fabricated for evaluation of sound pressure loss of a waterproof sound-transmitting membrane in Examples and showing a state where the member is placed on the simulant housing.

First, as shown in FIG. 8A, a simulant housing 91 (made of polystyrene and having outer dimensions of 60 mm×50 mm×28 mm) simulating a housing of a mobile phone was prepared. The simulant housing 91 was provided with one speaker attachment hole 92 (having the shape of a circle of 2.5 mm diameter) serving as an opening for allowing sound output from a speaker to be transmitted to the outside of the housing and with one guide hole 93 for a speaker cable, and had no other openings than these holes. Next, a speaker 95 (SCG-16A manufactured by STAR MICRONICS CO., LTD) was embedded into a filler 94 made of urethane sponge and having formed therein a sound-transmitting hole having the shape of a circle of 5 mm diameter, and was placed inside the housing 91. The speaker cable 96 of the speaker 95 was drawn outside the housing 91 through the guide hole 93, and then the guide hole 93 was closed with a putty.

Next, a double-faced tape 97 (No. 57120B manufactured by NITTO DENKO CORPORATION, having a thickness of 0.2 mm) made of a polyethylene foam, a PET film 98 (having a thickness of 0.1 mm), and a double-faced tape 99 (No. 5603 manufactured by NITTO DENKO CORPORATION, having a thickness of 0.03 mm) made of PET were prepared. Two ring-shaped pieces, specifically, a ring-shaped piece having an inner diameter of 2.5 mm and an outer diameter of 5.8 mm and a ring-shaped piece having an inner diameter of 1.0 mm and an outer diameter of 5.8 mm, were punched from each of the prepared tapes and film. Additionally, a circular piece having a diameter of 5.8 mm was punched from each of the waterproof sound-transmitting membranes 100 fabricated in Examples and Comparative Examples. Next, the ring-shaped piece of the double-faced tape 97 having an inner diameter of 2.5 mm, the circular piece of the waterproof sound-transmitting membrane 100, the ring-shaped piece of the double-faced tape 99 having an inner diameter of 2.5 mm, and the ring-shaped piece of the PET film 98 having an inner diameter of 2.5 mm were stacked in this order in such a manner that their outer peripheries were aligned with each other. Thus, a waterproof sound-transmitting member A (in which the waterproof sound-transmitting membrane had an effective area of 4.9 mm$^2$) for evaluation of acoustic characteristics was fabricated. Additionally, the ring-shaped piece of the double-faced tape 97 having an inner diameter of 1.0 mm, the circular piece of the waterproof sound-transmitting membrane 100, the ring-shaped piece of the double-faced tape 99 having an inner diameter of 1.0 mm, and the ring-shaped piece of the PET film 98 having an inner diameter of 1.0 mm were stacked in this order in such a manner that their outer peripheries were aligned with each other. Thus, a waterproof sound-transmitting member B (in which the waterproof sound-transmitting membrane had an effective area of 0.8 mm$^2$) for evaluation of acoustic characteristics was fabricated.

Next, each of the waterproof sound-transmitting members fabricated was attached to the exterior of the simulant housing 91 with the polyethylene foam-made double-faced tape 97 of the member so that the waterproof sound-transmitting membrane 100 fully covered the opening 92. This was done so as not to form a gap between the waterproof sound-transmitting membrane 100 and the double-faced tape 97 and between the double-faced tape 97 and the simulant housing 91.

Next, the speaker cable 96 and a microphone (Spm0405Hd4H-W8 manufactured by Knowles Acoustic Corporation) were connected to an acoustic evaluation system (Multi-analyzer System 3560-B-030 manufactured by B&K Components, Ltd.), and the microphone was placed at a distance of 21 mm from the speaker 95 in the simulant housing 91. Then, SSR analysis (test signals of 20 Hz to 10 kHz, sweep) was selected as an evaluation mode and carried out to evaluate the acoustic characteristics (THD and sound pressure loss) of the waterproof sound-transmitting membrane 100. The sound pressure loss was automatically determined based on the signal input to the speaker 95 from the acoustic evaluation system and the signal detected through the microphone. Additionally, a sound pressure loss in a blank state where the waterproof sound-transmitting membrane was not placed was determined in the same manner, and a value obtained by subtracting the blank sound pressure loss from the sound pressure loss determined with the waterproof sound-transmitting membrane being placed was used as an index of the sound pressure loss (insertion loss) which was one of the characteristics of the waterproof sound-transmitting membrane. A smaller insertion loss can be determined to indicate better keeping of the characteristics of sound transmitted through the waterproof sound-transmitting membrane. This evaluation was carried out for both of the waterproof sound-transmitting members A and B differing in membrane effective area for each of the waterproof sound-transmitting membranes fabricated in Examples and Comparative Examples.

Example 1

A commercially-available non-porous PET film (Track-etched membrane manufactured by it4ip) having formed therein a plurality of through holes extending through the thickness of the film was prepared. The thickness of the film was 20 μm, the diameter of the through holes was 3.0 μm, and the density of the through holes (hole density) was 1.6×10$^6$ holes/cm$^2$.

Next, the prepared film was immersed in an aqueous solution of potassium hydroxide (concentration=5 weight %) and ethanol (concentration=20 weight %) maintained at 80° C. for 70 minutes to radially expand the through holes. Thereafter, the film was taken out of the aqueous solution, washed with water, and dried. At this stage, the thickness of the film was 18 μm, and the diameter of the through holes was 5.0 μm (the hole density remained unchanged).

Next, the dried film was dyed with a black dye to fabricate a black film. Subsequently, the fabricated black film was immersed in a liquid-repellent treatment liquid for 3 seconds, then drawn out of the treatment liquid, and left to dry at ordinary temperature for 30 minutes, so that a liquid-repellent layer was formed on the surface of the resin film. In this manner, a waterproof sound-transmitting membrane was obtained. The liquid-repellent treatment liquid was prepared by diluting a liquid-repellent agent (X-70-029C manufactured by Shin-Etsu Chemical Co., Ltd.) with a diluent (FS thinner manufactured by Shin-Etsu Chemical Co., Ltd.) to a concentration of 0.7 weight %.

For the resin film in the thus-obtained waterproof sound-transmitting membrane, the diameter of the through holes was 5.0 µm, the porosity was 31.4%, and the hole density was 1.6×10$^6$ holes/cm$^2$. For the waterproof sound-transmitting membrane, the surface density was 17.1 g/m$^2$, the air permeability was 6.1 cm$^3$/(cm$^2$·second), the water entry pressure was 22 kPa, the thickness was 18 µm, and the oil repellency was "present".

Example 2

A waterproof sound-transmitting membrane was obtained in the same manner as in Example 1, except that the resin film was colored pink by using a pink dye instead of a black dye.

For the resin film in the thus-obtained waterproof sound-transmitting membrane, the diameter of the through holes was 5.0 µm, the porosity was 31.4%, and the hole density was 1.6×10$^6$ holes/cm$^2$. For the waterproof sound-transmitting membrane, the surface density was 17.1 g/m$^2$, the air permeability was 6.1 cm$^3$/(cm$^2$·second), the water entry pressure was 22 kPa, the thickness was 18 µm, and the oil repellency was "present".

Example 3

A commercially-available non-porous PET film (Track-etched membrane manufactured by it4ip) having formed therein a plurality of through holes extending through the thickness of the film was prepared. The thickness of the film was 20 µm, the diameter of the through holes was 3.0 µm, and the density of the through holes (hole density) was 1.0×10$^6$ holes/cm$^2$. The film used in Example 3 was a film in which the through holes extend in directions inclined with respect to the direction perpendicular to the principal surfaces of the film and in which through holes extending in different inclined directions are present together. The films used in the other Examples and Comparative Examples 1 to 3 were films in which the through holes extend in the direction perpendicular to the principal surfaces of the films.

Next, the prepared film was immersed in an aqueous solution of potassium hydroxide (concentration=5 weight %) and ethanol (concentration=20 weight %) maintained at 80° C. for 150 minutes to radially expand the through holes. Thereafter, the film was taken out of the aqueous solution, washed with water, and dried. At this stage, the thickness of the film was 16 µm, and the diameter of the through holes was 7.0 µm (the hole density remained unchanged).

Next, the dried film was dyed with a black dye to fabricate a black film. Subsequently, the fabricated black film was immersed in a liquid-repellent treatment liquid for 3 seconds, then drawn out of the treatment liquid, and left to dry at ordinary temperature for 30 minutes, so that a liquid-repellent layer was formed on the surface of the resin film. In this manner, a waterproof sound-transmitting membrane was obtained. The liquid-repellent treatment liquid was prepared by diluting a liquid-repellent agent (X-70-029C manufactured by Shin-Etsu Chemical Co., Ltd.) with a diluent (FS thinner manufactured by Shin-Etsu Chemical Co., Ltd.) to a concentration of 0.8 weight %.

For the resin film in the thus-obtained waterproof sound-transmitting membrane, the diameter of the through holes was 7.0 µm, the porosity was 38.5%, and the hole density was 1.0×10$^6$ holes/cm$^2$. For the waterproof sound-transmitting membrane, the surface density was 13.6 g/m$^2$, the air permeability was 15 cm$^3$/(cm$^2$·second), the water entry pressure was 15 kPa, the thickness was 16 µm, and the oil repellency was "present".

Example 4

A commercially-available non-porous PET film (Track-etched membrane manufactured by it4ip) having formed therein a plurality of through holes extending through the thickness of the film was prepared. The thickness of the film was 41 µm, the diameter of the through holes was 10.0 µm, and the density of the through holes (hole density) was 5.0×10$^5$ holes/cm$^2$.

Next, the prepared film was dyed with a black dye to fabricate a black film. Subsequently, the fabricated black film was immersed in a liquid-repellent treatment liquid for 3 seconds, then drawn out of the treatment liquid, and left to dry at ordinary temperature for 30 minutes, so that a liquid-repellent layer was formed on the surface of the resin film. In this manner, a waterproof sound-transmitting membrane was obtained. The liquid-repellent treatment liquid was prepared by diluting a liquid-repellent agent (X-70-029C manufactured by Shin-Etsu Chemical Co., Ltd.) with a diluent (FS thinner manufactured by Shin-Etsu Chemical Co., Ltd.) to a concentration of 1.0 weight %.

For the resin film in the thus-obtained waterproof sound-transmitting membrane, the diameter of the through holes was 10.0 µm, the porosity was 39.3%, and the hole density was 5.0×10$^5$ holes/cm$^2$. For the waterproof sound-transmitting membrane, the surface density was 37.2 g/m$^2$, the air permeability was 12 cm$^3$/(cm$^2$·second), the water entry pressure was 12 kPa, the thickness was 41 µm, and the oil repellency was "present".

Comparative Example 1

A commercially-available non-porous PET film (Oxydisk manufactured by Oxyphen AG) having formed therein a plurality of through holes extending through the thickness of the film was prepared. The thickness of the film was 25 µm, the diameter of the through holes was 1.0 µm, and the density of the through holes (hole density) was 3.5×10$^7$ holes/cm$^2$.

Next, the prepared film was immersed in a liquid-repellent treatment liquid for 3 seconds, then drawn out of the treatment liquid, and left to dry at ordinary temperature for 1 hour, so that a liquid-repellent layer was formed on the surface of the resin film. In this manner, a waterproof sound-transmitting membrane was obtained. The liquid-repellent treatment liquid was prepared by diluting a liquid-repellent agent (X-70-029C manufactured by Shin-Etsu Chemical Co., Ltd.) with a diluent (FS thinner manufactured by Shin-Etsu Chemical Co., Ltd.) to a concentration of 2.5 weight %.

For the resin film in the thus-obtained waterproof sound-transmitting membrane, the diameter of the through holes was 1.0 µm, the porosity was 27.0%, and the hole density was 3.5×10$^7$ holes/cm$^2$. For the waterproof sound-transmitting membrane, the surface density was 26.0 g/m$^2$, the air permeability was 0.4 cm$^3$/(cm$^2$·second), the water entry pressure was 105 kPa, the thickness was 25 µm, and the oil repellency was "present".

Comparative Example 2

A commercially-available non-porous PET film (Track-etched membrane manufactured by it4ip) having formed therein a plurality of through holes extending through the thickness of the film was prepared. The thickness of the film was 20 μm, the diameter of the through holes was 2.8 μm, and the density of the through holes (hole density) was $4.9 \times 10^6$ holes/cm$^2$.

Next, the prepared film was immersed in a liquid-repellent treatment liquid for 3 seconds, then drawn out of the treatment liquid, and left to dry at ordinary temperature for 1 hour, so that a liquid-repellent layer was formed on the surface of the resin film. In this manner, a waterproof sound-transmitting membrane was obtained. The liquid-repellent treatment liquid was prepared by diluting a liquid-repellent agent (X-70-029C manufactured by Shin-Etsu Chemical Co., Ltd.) with a diluent (FS thinner manufactured by Shin-Etsu Chemical Co., Ltd.) to a concentration of 2.5 weight %.

For the resin film in the thus-obtained waterproof sound-transmitting membrane, the diameter of the through holes was 2.8 μm, the porosity was 30.0%, and the hole density was $4.9 \times 10^6$ holes/cm$^2$. For the waterproof sound-transmitting membrane, the surface density was 19.3 g/m$^2$, the air permeability was 1.8 cm$^3$/(cm$^2$·second), the water entry pressure was 35 kPa, the thickness was 20 μm, and the oil repellency was "present".

Comparative Example 3

A commercially-available non-porous PET film (Track-etched membrane manufactured by it4ip) having formed therein a plurality of through holes extending through the thickness of the film was prepared. The thickness of the film was 41 μm, the diameter of the through holes was 10.0 μm, and the density of the through holes (hole density) was $2.2 \times 10^5$ holes/cm$^2$.

Next, the prepared film was immersed in an aqueous solution of potassium hydroxide (concentration=5 weight %) and ethanol (concentration=20 weight %) maintained at 80° C. for 180 minutes to radially expand the through holes. Thereafter, the film was taken out of the aqueous solution, washed with water, and dried. At this stage, the thickness of the film was 35 μm, and the diameter of the through holes was 15.0 μm (the hole density remained unchanged).

Next, the dried film was dyed with a black dye to fabricate a black film. Subsequently, the fabricated black film was immersed in a liquid-repellent treatment liquid for 3 seconds, then drawn out of the treatment liquid, and left to dry at ordinary temperature for 30 minutes, so that a liquid-repellent layer was formed on the surface of the resin film. In this manner, a waterproof sound-transmitting membrane was obtained. The liquid-repellent treatment liquid was prepared by diluting a liquid-repellent agent (X-70-029C manufactured by Shin-Etsu Chemical Co., Ltd.) with a diluent (FS thinner manufactured by Shin-Etsu Chemical Co., Ltd.) to a concentration of 1.2 weight %.

For the resin film in the thus-obtained waterproof sound-transmitting membrane, the diameter of the through holes was 15.0 μm, the porosity was 35.3%, and the hole density was $2.2 \times 10^5$ holes/cm$^2$. For the waterproof sound-transmitting membrane, the surface density was 31.3 g/m$^2$, the air permeability was 30 cm$^3$/(cm$^2$·second), the water entry pressure was 3 kPa, the thickness was 35 μm, and the oil repellency was "present".

Comparative Example 4

In Comparative Example 4, a stretched porous membrane of polytetrafluoroethylene (PTFE) (NTF1033 manufactured by NITTO DENKO CORPORATION) was used as a waterproof sound-transmitting membrane without any change.

For this waterproof sound-transmitting membrane, the average pore diameter was 3.0 μm, the porosity was 85.0%, the surface density was 4.0 g/m$^2$, the air permeability was 6.0 cm$^3$/(cm$^2$·second), the water entry pressure was 8 kPa, the thickness was 20 μm, and the oil repellency was "absent".

Comparative Example 5

In Comparative Example 5, a waterproof sound-transmitting membrane composed of a stretched porous membrane of PTFE was fabricated.

First, 100 parts by weight of a PTFE fine powder (F-104 manufactured by DAIKIN INDUSTRIES, LTD.) and 20 parts by weight of n-dodecane (manufactured by Japan Energy Corporation) functioning as an auxiliary forming agent were uniformly mixed, and the obtained mixture was compressed with a cylinder, and then formed into a sheet by ram extrusion. Next, the sheet-shaped mixture obtained was passed through a pair of metal rolls, and thus rolled to a thickness of 0.16 mm. Thereafter, the mixture was dried by heating at 150° C. to remove the auxiliary forming agent. Thus, a sheet-shaped body of PTFE was obtained. Next, the sheet-shaped body obtained was stretched in the longitudinal direction (rolling direction) at a stretching temperature of 260° C. at a stretching ratio of 10, and thus a porous PTFE membrane was obtained. Next, the obtained porous PTFE membrane was immersed, for several seconds, in a dyeing solution obtained by mixing 20 parts by weight of a black dye (SP BLACK 91-L manufactured by Orient Chemical Industries Co., Ltd., a 25 weight % solution diluted with ethanol) and 80 parts by weight of ethanol (purity=95%) which was a solvent for the dye. Thereafter, the membrane was heated and dried at 100° C. to remove the solvent. In this manner, the membrane was colored black.

Next, the black porous membrane fabricated was subjected to a liquid-repellent treatment in which the membrane was immersed in a liquid-repellent treatment liquid for several seconds, then drawn out of the treatment liquid, heated and dried at 100° C. to remove the solvent. The liquid-repellent treatment liquid was prepared as follows. First, 100 g of a linear fluoroalkyl group-containing compound represented by the formula (2) below, 0.1 g of azobisisobutyronitrile functioning as a polymerization initiator, and 300 g of a solvent (FS thinner manufactured by Shin-Etsu Chemical Co., Ltd.) were put into a flask equipped with a nitrogen introduction tube, a thermometer, and a stirrer. Next, nitrogen gas was introduced into the flask to allow addition polymerization of the compound to proceed under stirring at 70° C. for 16 hours. Thus, 80 g of a polymer of the compound (fluorine-containing polymer having a number average molecular weight of 100000) was obtained. Next, the obtained polymer was diluted with a diluent (FS thinner manufactured by Shin-Etsu Chemical Co., Ltd.) so that the concentration of the polymer was 3.0 weight %. Thus, the liquid-repellent treatment liquid was obtained.

$$CH_2=CHCOOCH_2CH_2C_6F_{13} \qquad (2)$$

Next, the porous PTFE membrane subjected to the liquid-repellent treatment was stretched in the width direction at a stretching temperature of 150° C. at a stretching ratio of 10, and the entire membrane was sintered at 360° C. which is above the melting point of PTFE (327° C.) to obtain a waterproof sound-transmitting membrane which was a stretched porous resin membrane of PTFE.

For the thus-obtained waterproof sound-transmitting membrane, the average pore diameter was 0.5 μm, the surface density was 5 g/m$^2$, the porosity was 88.0%, the air permeability was 3.2 cm³/(cm²·second), the water entry pressure was 80 kPa, the thickness was 15 μm, and the oil repellency was "present".

Figure 9A:
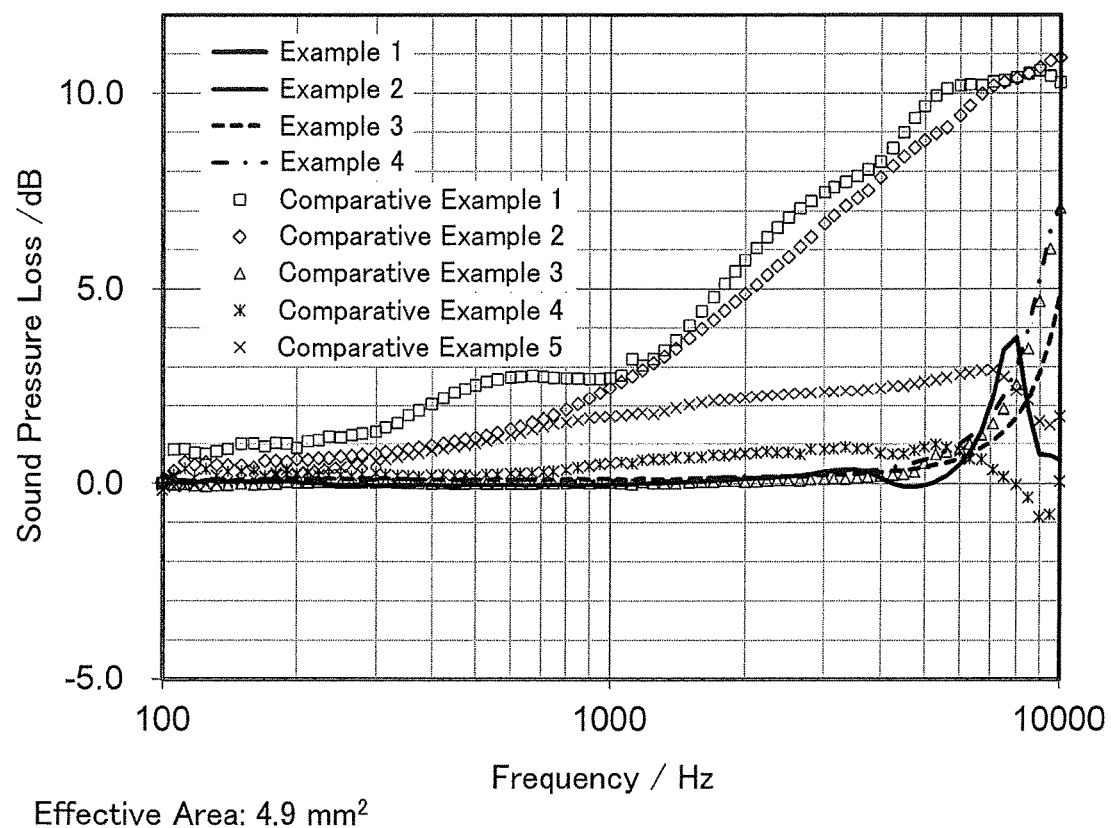
FIG. 9A is a graph showing the sound pressure loss for waterproof sound-transmitting membranes (effective area=4.9 mm$^2$) of Examples and Comparative Examples.
Figure 9B:
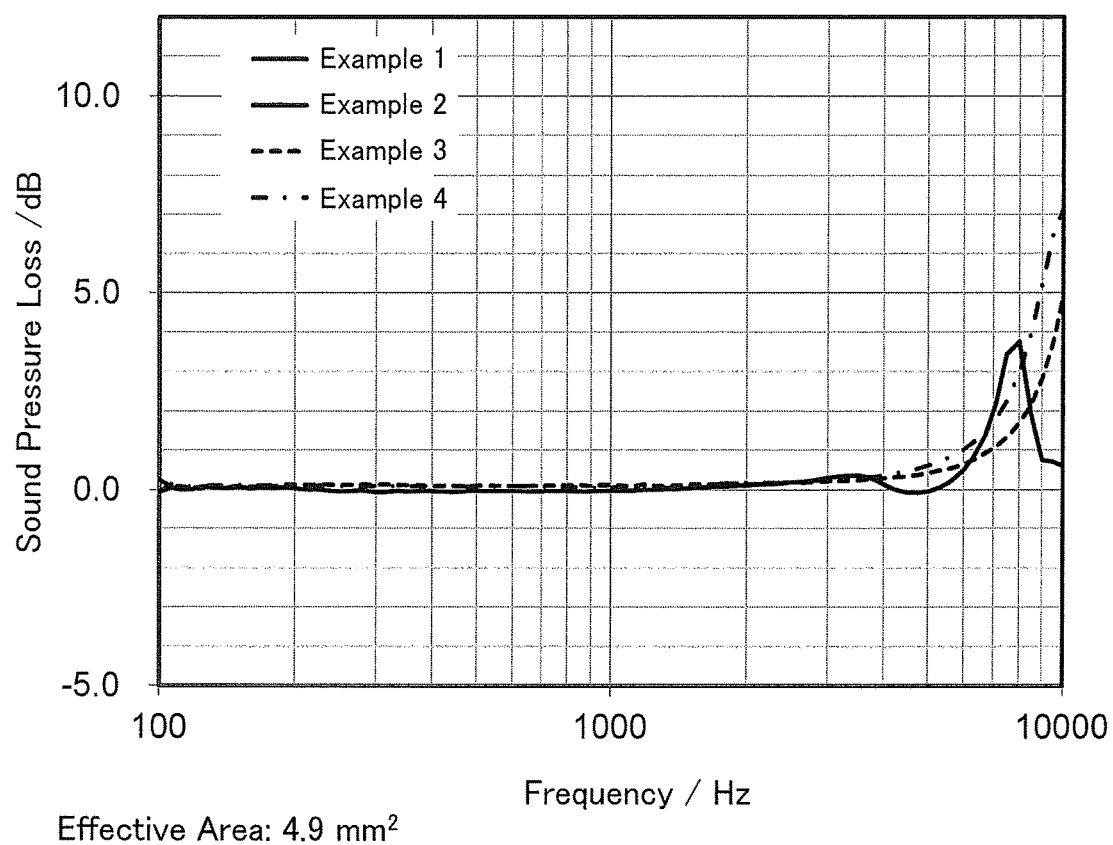
FIG. 9B is a graph showing the sound pressure loss for waterproof sound-transmitting membranes (effective area=4.9 mm$^2$) of Examples.
Figure 9C:
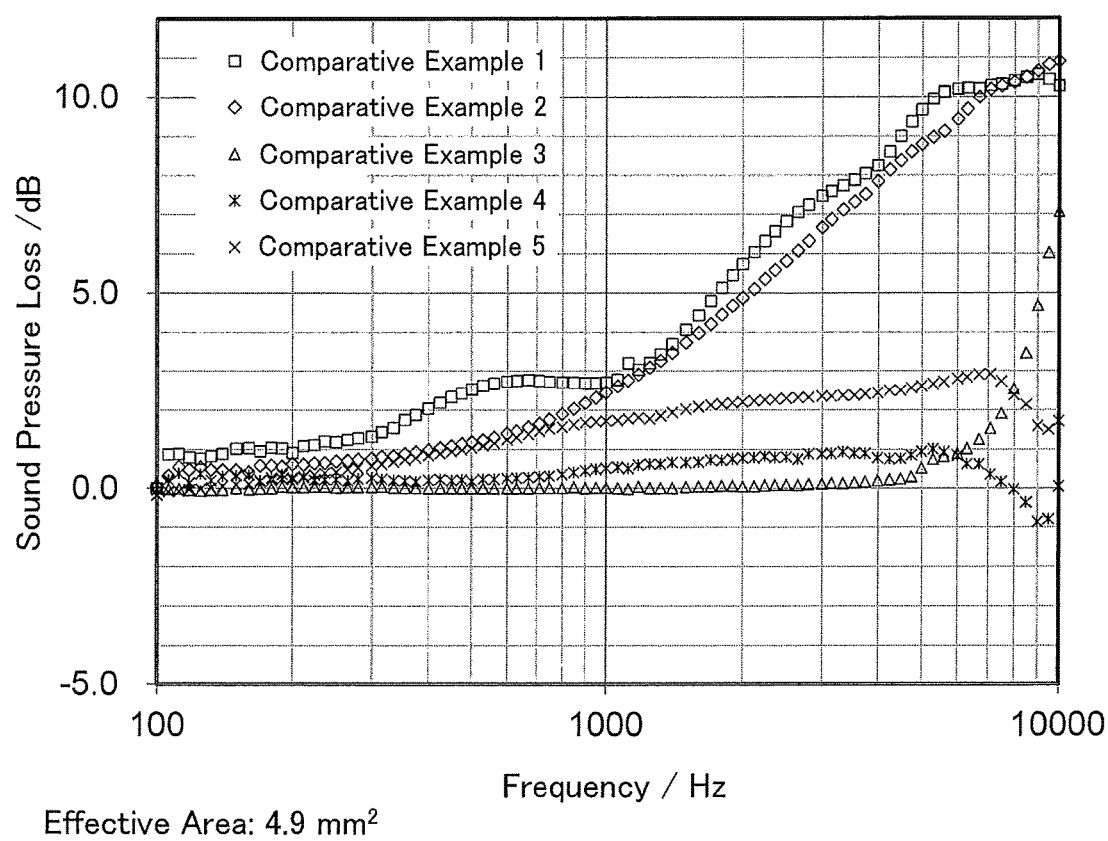
FIG. 9C is a graph showing the sound pressure loss for waterproof sound-transmitting membranes (effective area=4.9 mm$^2$) of Comparative Examples.
Figure 10A:
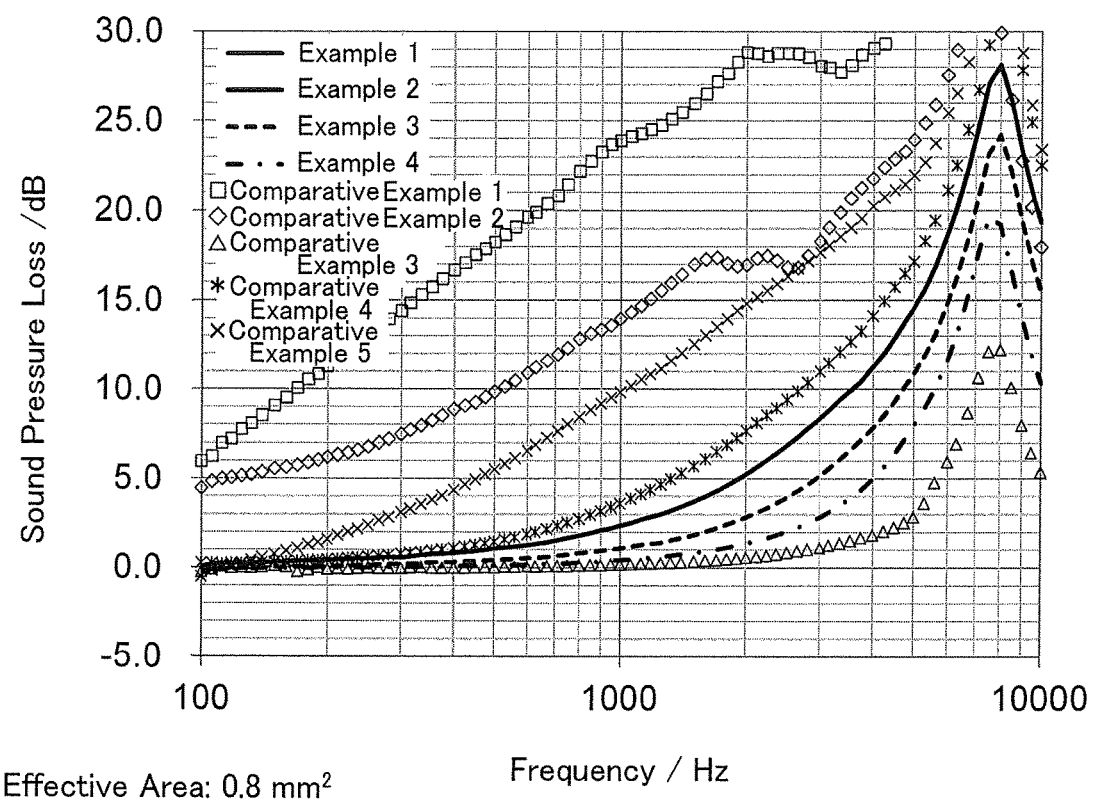
FIG. 10A is a graph showing the sound pressure loss for waterproof sound-transmitting membranes (effective area=0.8 mm$^2$) of Examples and Comparative Examples.
Figure 10B:
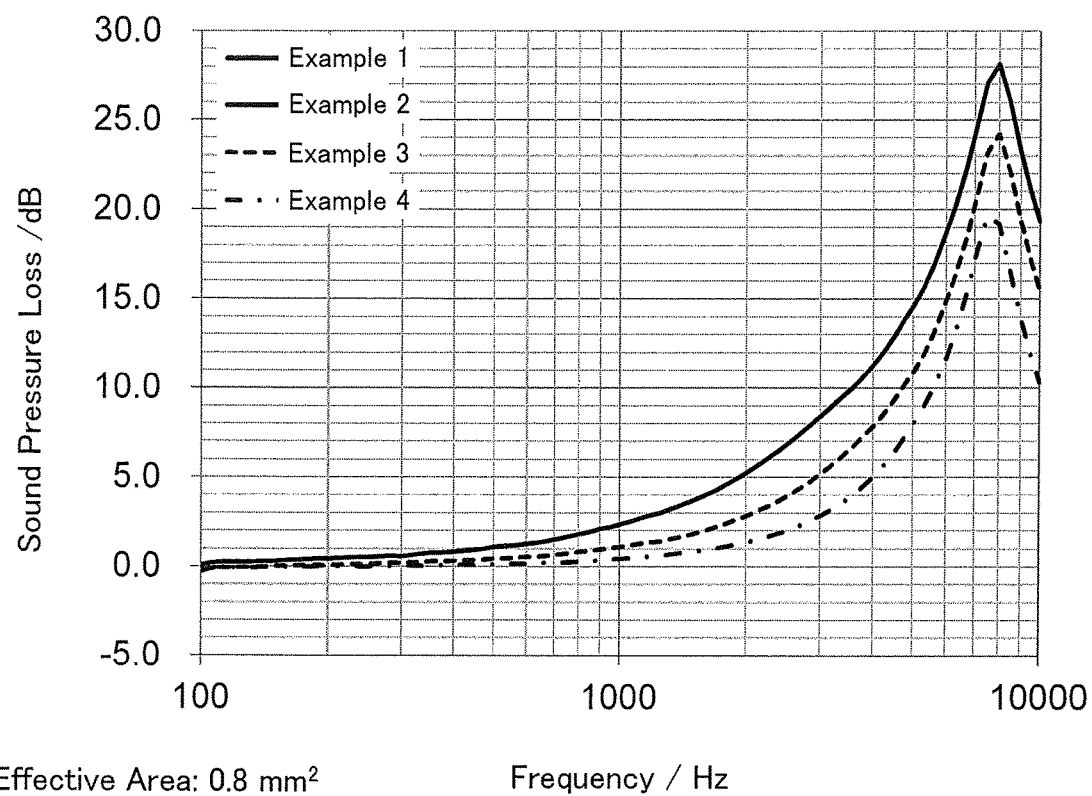
FIG. 10B is a graph showing the sound pressure loss for waterproof sound-transmitting membranes (effective area=0.8 mm$^2$) of Examples.
Figure 10C:
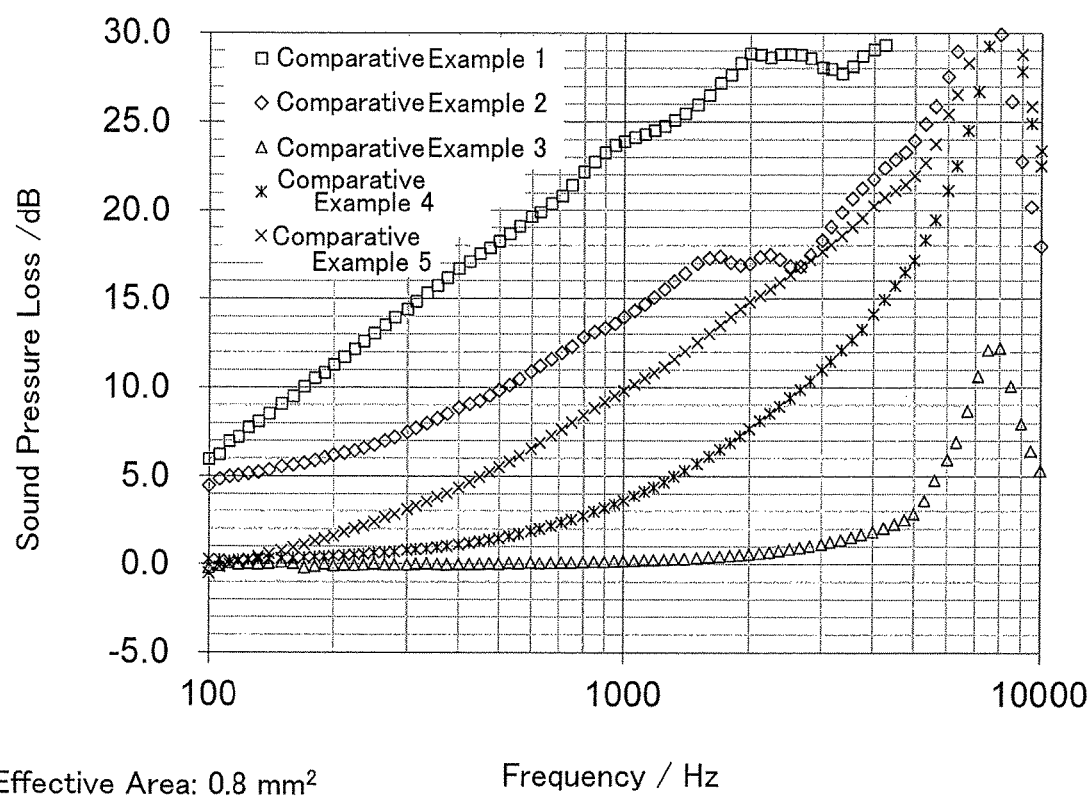
FIG. 10C is a graph showing the sound pressure loss for waterproof sound-transmitting membranes (effective area=0.8 mm$^2$) of Comparative Examples.

The characteristics of the waterproof sound-transmitting membranes fabricated in Examples and Comparative Examples are collectively listed in Table 1. The acoustic characteristics (sound pressure loss) of the waterproof sound-transmitting membranes fabricated in Examples and Comparative Examples are shown in FIG. 9A to FIG. 10C. In addition, the sound pressure loss for sound with a frequency of 1 kHz, the sound pressure loss for sound with a frequency of 3 kHz, and the maximum value of the sound pressure loss at frequencies ranging from 100 Hz to 3 kHz are shown in Table 2 below. In the cells "Diameter of through holes" for Comparative Examples 4 and 5 in Table 1, the average pore diameters (μm) are shown since the waterproof sound-transmitting membranes fabricated in Comparative Examples 4 and 5 were composed of a stretched porous membrane. For Comparative Examples 4 and 5, the hole density was not evaluable, and therefore is represented by "-(unmeasured)". FIG. 9A to FIG. 9C show results obtained when the waterproof sound-transmitting membranes had an effective area of 4.9 mm² (when the waterproof sound-transmitting members A were used). FIG. 9A shows the results both for Examples and Comparative Examples, FIG. 9B shows the results only for Examples, and FIG. 9C shows the results only for Comparative Examples. FIG. 10A to FIG. 10C show results obtained when the waterproof sound-transmitting membranes had an effective area of 0.8 mm² (when the waterproof sound-transmitting members B were used). FIG. 10A shows the results both for Examples and Comparative Examples, FIG. 10B shows the results only for Examples, and FIG. 10C shows the results only for Comparative Examples.

TABLE 1

| | Diameter Of Through Holes [μm] | Surface density [g/m²] | Porosity [%] | Air permeability [cm³cm⁻²s⁻¹] | Water Entry pressure [kPa] | Thickness [μm] | Hole density [holes/cm²] |
|---|---|---|---|---|---|---|---|
| Example 1 | 5.0 | 17.1 | 31.4 | 6.1 | 22 | 18 | $1.6 \times 10^6$ |
| Example 2 | 5.0 | 17.1 | 31.4 | 6.1 | 22 | 18 | $1.6 \times 10^6$ |
| Example 3 | 7.0 | 13.6 | 38.5 | 15 | 15 | 16 | $1.0 \times 10^6$ |
| Example 4 | 10.0 | 37.2 | 39.3 | 12 | 12 | 41 | $5.0 \times 10^5$ |
| Comp. Example 1 | 1.0 | 26.0 | 27.0 | 0.4 | 105 | 25 | $3.5 \times 10^7$ |
| Comp. Example 2 | 2.8 | 19.3 | 30.0 | 1.8 | 35 | 20 | $4.9 \times 10^6$ |
| Comp. Example 3 | 15.0 | 31.3 | 35.3 | 30 | 3 | 35 | $2.2 \times 10^5$ |
| Comp. Example 4 | 3.0 | 4.0 | 85.0 | 6.0 | 8 | 20 | — |
| Comp. Example 5 | 0.5 | 5.0 | 88.0 | 3.2 | 80 | 15 | — |

TABLE 2

| | Sound pressure loss [dB] | | | | | |
|---|---|---|---|---|---|---|
| | Effective area 4.9 mm² | | | Effective area 0.8 mm² | | |
| | 1 kHz | 3 kHz | 100 Hz-3 kHz | 1 kHz | 3 kHz | 100 Hz-3 kHz |
| Example 1 | 0.0 | 0.3 | 0.3 | 2.4 | 8.4 | 8.4 |
| Example 2 | 0.0 | 0.3 | 0.3 | 2.4 | 8.4 | 8.4 |
| Example 3 | 0.1 | 0.2 | 0.2 | 1.1 | 5.2 | 5.2 |
| Example 4 | 0.1 | 0.2 | 0.2 | 0.4 | 2.8 | 2.8 |
| Comp. Example 1 | 2.7 | 7.5 | 7.5 | 23.9 | 28.1 | 28.8 |
| Comp. Example 2 | 2.5 | 6.7 | 6.7 | 14.0 | 18.3 | 18.3 |
| Comp. Example 3 | 0.0 | 0.1 | 0.1 | 0.2 | 1.1 | 1.1 |
| Comp. Example 4 | 0.5 | 0.9 | 0.9 | 3.6 | 11.0 | 11.0 |
| Comp. Example 5 | 1.7 | 2.4 | 2.4 | 9.8 | 17.7 | 17.7 |

As shown in Tables 1 and 2 and in FIG. 9A to FIG. 10C, the waterproof sound-transmitting membranes of Examples 1 to 4 were markedly improved in terms of sound pressure loss, as compared with the waterproof sound-transmitting membranes of Comparative Examples 1 and 2 in which the diameter of the through holes was less than 4.0 μm and the air permeability was less than 2.0 cm³/(cm²·second). In particular, when the effective area was 4.9 mm², the sound pressure loss was approximately zero and flat (0.3 dB at most) at the frequencies ranging from 100 Hz to 3 kHz. In addition, for the waterproof sound-transmitting membranes of Examples 1 to 4, a water entry pressure of 10 kPa (corresponding to IPX-7) was ensured. By contrast, for Comparative Example 3 in which the diameter of the through holes was more than 12.0 μm, the water entry pressure was small and specifically 3 kPa. As for the waterproof sound-transmitting membranes of Comparative Examples 4 and 5 composed of a stretched porous membrane, the waterproof sound-transmitting membrane of Comparative Example 4 was inferior in acoustic characteristics and water entry pressure to the waterproof sound-transmitting membranes of Examples 1 to 4, while the waterproof sound-transmitting membrane of Comparative Example 5 had a large water entry pressure but was inferior in acoustic characteristics to the waterproof sound-transmitting membranes of Examples 1 to 4.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The waterproof sound-transmitting membrane of the present disclosure can be used in the same applications as conventional waterproof sound-transmitting membranes.

The invention claimed is:

1. A waterproof sound-transmitting member comprising:
   a waterproof sound-transmitting membrane; and
   a support member joined to a peripheral region of the waterproof sound-transmitting membrane, wherein
   the waterproof sound-transmitting membrane comprises:
      a non-porous resin film having formed therein a plurality of through holes extending through a thickness of the non-porous resin film; and
      a liquid-repellent layer formed on a principal surface of the non-porous resin film and having openings at positions corresponding to positions of the plurality of through holes,
   the through holes are straight holes that extend straight through the non-porous resin film, and each of the through holes has a diameter of 4.0 μm or more and 12.0 μm or less,
   the waterproof sound-transmitting membrane has a through-thickness air permeability of 2.0 cm$^3$/(cm$^2$·second) or more and 50 cm$^3$/(cm$^2$·second) or less in terms of Frazier number as measured according to JIS L 1096,
   the waterproof sound-transmitting membrane has a water entry pressure, as measured according to Method B (high hydraulic pressure method) of water penetration test specified in JIS L 1092, of 5 kPa or more,
   the liquid-repellent layer is formed of a material which is different from a material of the non-porous resin film,
   the principal surfaces of the non-porous resin film and inner circumferential surfaces of the through holes are coated with the liquid-repellent layer, and
   the waterproof sound-transmitting membrane has:
      a thickness of more than 15 μm;
      an effective area of 4.9 mm$^2$ or less; and
      a sound pressure loss at frequencies ranging from 100 Hz to 3 kHz being 1 dB or less when the waterproof sound-transmitting membrane has the effective area of 4.9 mm$^2$, and the effective area is defined by an area of an opening portion of the support member.

2. The waterproof sound-transmitting member according to claim 1, wherein the waterproof sound-transmitting membrane has the sound pressure loss at frequencies ranging from 100 Hz to 3 kHz of 10 dB or less when the waterproof sound-transmitting membrane has the effective area of 0.8 mm$^2$.

3. The waterproof sound-transmitting member according to claim 1, wherein the through holes are distributed at a density of 3×10$^5$ holes/cm$^2$ or more and 4×10$^6$ holes/cm$^2$ or less in the non-porous resin film.

4. The waterproof sound-transmitting member according to claim 1, wherein the non-porous resin film is formed of a resin that can be etched with an alkaline solution or an oxidant solution.

5. The waterproof sound-transmitting member according to claim 1, wherein the non-porous resin film is formed of at least one resin selected from polyethylene terephthalate, polycarbonate, polyimide, polyethylene naphthalate, and polyvinylidene fluoride.

6. The waterproof sound-transmitting member according to claim 1, wherein the waterproof sound-transmitting membrane is subjected to coloring treatment so as to be capable of absorbing light included in a wavelength range from 380 nm to 500 nm.

7. The waterproof sound-transmitting member according to claim 1, wherein the waterproof sound-transmitting membrane is colored black, gray, brown, or pink.

8. An electronic device comprising:
   a housing containing an audio part and provided with an opening configured to allow sound to be transmitted between the audio part and an outside of the housing; and
   a waterproof sound-transmitting member comprising a waterproof sound-transmitting membrane and a support member joined to the waterproof sound-transmitting membrane, wherein
   the waterproof sound-transmitting member is joined to the housing via the support member such that the waterproof sound-transmitting membrane covers the opening, the waterproof sound-transmitting membrane being configured to:
      allow sound to transmit between the audio part and the outside of the outside of the housing, and
      prevent water from entering the housing from the outside through the opening, and
   the waterproof sound-transmitting membrane is the waterproof sound-transmitting member according to claim 1.

9. An electronic device case designed to contain an electronic device having an audio part, the electronic device case comprising:
   an opening provided to allow sound to be transmitted between the audio part of the electronic device and an outside of the case; and
   a waterproof sound-transmitting member comprising a waterproof sound-transmitting membrane and a support member joined to the waterproof sound-transmitting membrane, wherein
   the waterproof sound-transmitting member is joined to the case via the support member such that the waterproof sound-transmitting membrane covers the opening, the waterproof sound-transmitting membrane configured to allow sound to transmit between the audio part of the electronic device and the outside of the case, and the waterproof sound-transmitting membrane prevents water from entering the case from the outside through the opening, and
   the waterproof sound-transmitting member is the waterproof sound-transmitting member according to claim 1.

10. A waterproof sound-transmitting structure comprising:
   a housing provided with an opening for allowing sound to be transmitted between an inside and an outside of the housing; and
   a waterproof sound-transmitting member comprising a waterproof sound-transmitting membrane and a support member joined to the waterproof sound-transmitting membrane, wherein
   the waterproof sound-transmitting member is joined to the housing via the support member so that the waterproof sound-transmitting membrane covers the opening, the waterproof sound-transmitting membrane configured to allow sound to be transmitted between the inside and the outside of the housing, and the waterproof sound-transmitting membrane is configured to prevent water from entering the inside from the outside through the opening, and the waterproof sound-transmitting member is the waterproof sound-transmitting member according to claim 1.

* * * * *